United States Patent [19]

Takahara et al.

[11] Patent Number: 5,477,351
[45] Date of Patent: Dec. 19, 1995

[54] POLYMER DISPERSED LIQUID CRYSTAL PANEL WITH DIFFRACTION GRATING AND REFLECTIVE COUNTER ELECTRODE

[75] Inventors: Hiroshi Takahara, Neyagawa; Hideki Ohmae, Suita, both of Japan

[73] Assignee: Matsushita Electric Industrial Co., Ltd., Osaka, Japan

[21] Appl. No.: 44,074

[22] Filed: Apr. 8, 1993

[30] Foreign Application Priority Data

Apr. 10, 1992 [JP] Japan .................................. 4-090508
Apr. 15, 1992 [JP] Japan .................................. 4-095068

[51] Int. Cl.$^6$ .......................... G02F 1/1335; G02F 1/13; G02F 1/137
[52] U.S. Cl. .................. 359/40; 359/51; 359/95
[58] Field of Search ................... 359/70, 95, 40, 359/41, 51

[56] References Cited

U.S. PATENT DOCUMENTS

| | | | |
|---|---|---|---|
| 4,195,915 | 4/1980 | Lichty et al. | 350/345 |
| 4,613,207 | 9/1986 | Fergason | 350/331 |
| 4,688,900 | 8/1987 | Doane et al. | 350/347 |
| 4,850,681 | 7/1989 | Yamanobe et al. | 350/348 |
| 4,883,343 | 11/1989 | Teshirogi | 350/338 |
| 4,977,456 | 12/1990 | Furuya | 358/213.13 |
| 5,105,289 | 4/1992 | Sonehara et al. | 359/70 |
| 5,148,298 | 9/1992 | Shigeta et al. | 359/72 |
| 5,148,302 | 9/1992 | Nagano et al. | 359/95 |
| 5,299,289 | 3/1994 | Omae et al. | 359/51 |
| 5,374,371 | 12/1994 | Takeuchi et al. | 359/51 |

FOREIGN PATENT DOCUMENTS

| | | | |
|---|---|---|---|
| 00467659 | 1/1992 | European Pat. Off. | 359/70 |
| 0209482 | 8/1989 | Japan | 359/41 |
| 2-244089 | 9/1990 | Japan . | |
| 3-98022 | 4/1991 | Japan . | |

OTHER PUBLICATIONS

Proceedings of the 9th International Display Research Conference, Oct. 16–18, 1989 (Japan Display '89, pp. 584–587).

Primary Examiner—William L. Sikes
Assistant Examiner—Charles Miller
Attorney, Agent, or Firm—Wenderoth, Lind & Ponack

[57] ABSTRACT

Pixel electrodes of a liquid crystal panel are made of a transparent conductive material, while a reflection electrode is formed on a counter substrate. A liquid crystal layer made of liquid crystal/resin composite is interposed between the pixel electrodes and the reflection electrode. Incident light is scattered in the liquid crystal layer or transmits the liquid crystal layer and is reflected by the reflection electrode according to the applied voltage to modulate the light. The pixel electrodes consist for example of two layers of a dielectric layer of thickness of $\lambda/4$ and a transparent conductive layer of thickness of $\lambda/2$. A grating is formed on the reflection electrode at the interface with the liquid crystal. When a voltage is applied to the liquid crystal layer, the refractive index thereof changes to be equal to that of the grating, and the incident light propagates straightly. Otherwise the incident light is diffracted. The liquid crystal panel is used as a light bulb for a projection type television.

48 Claims, 17 Drawing Sheets

"OFF" state

"ON" state

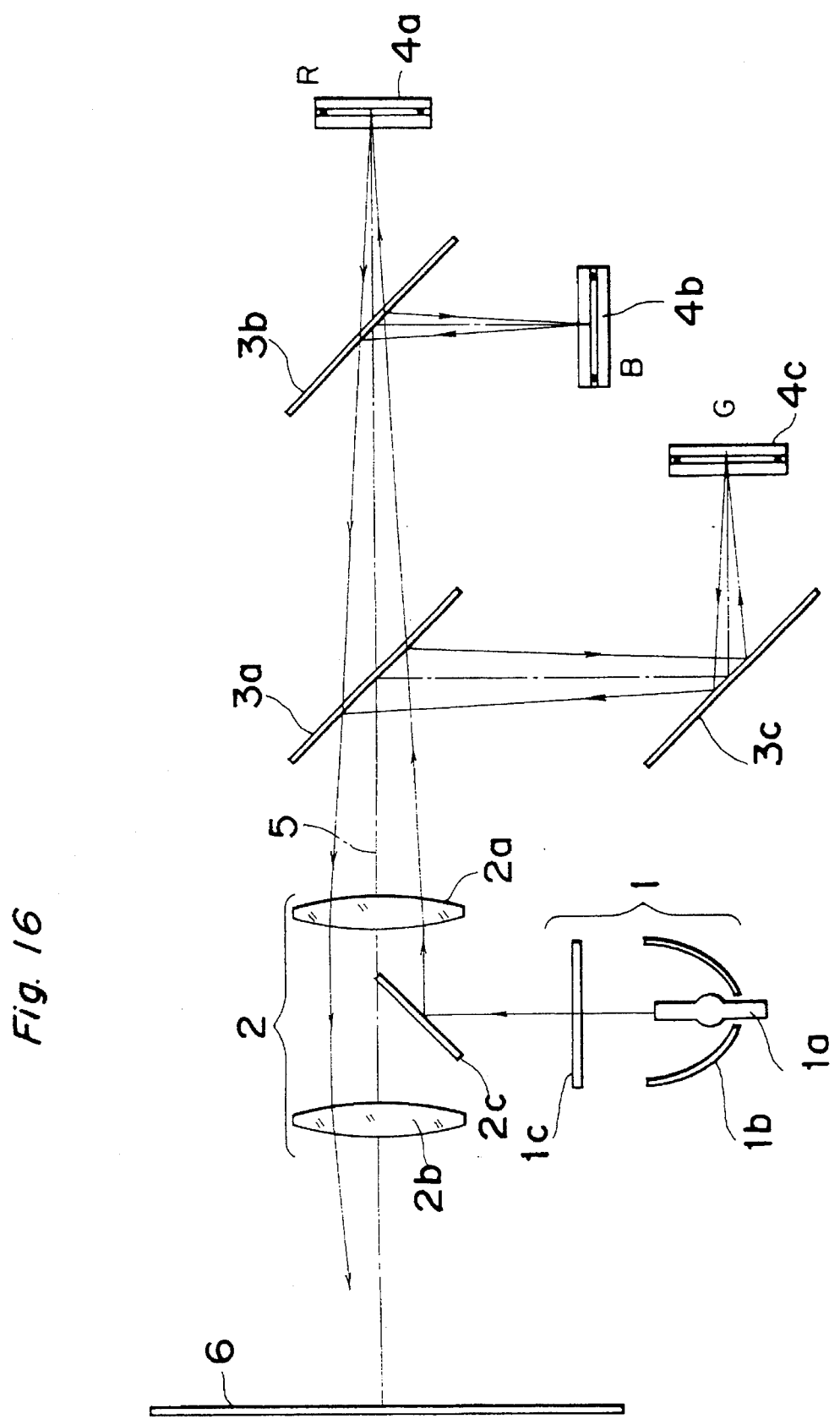

POLYMER DISPERSED LIQUID CRYSTAL PANEL WITH DIFFRACTION GRATING AND REFLECTIVE COUNTER ELECTRODE

BACKGROUND OF THE INVENTION

1. Field of the Invention

The present invention relates to a liquid crystal panel and a liquid crystal display apparatus which uses the liquid crystal panel.

2. Description of the Prior Art

The liquid crystal panel has been developed intensively because it has many advantages such as its light weight and compactness. However, there remain many problems. For example, it is difficult to enlarge the size of display area size. A projection type television has thus attracted attention wherein a display image of a small size liquid crystal panel is magnified by projecting it with a projection lens or the like on a screen. A commercial liquid crystal projection type television uses a twisted nematic liquid crystal panel which uses the optical rotation characteristic of liquid crystal.

A liquid crystal panel to be used in a projection type television has to be compact. Otherwise the size of projection lens increases and the system size also becomes large, and this results in a high cost and poor portability.

On the other hand, the number of pixels of a liquid crystal panel has had a tendency to be increased. For example, in the MUSE scheme of a highvision television of Japan, 1.3 million pixels are needed. If such a large number of pixels are formed in a compact liquid crystal panel, a ratio of the area required for switching elements for the pixels will increase. Usually, a thin film transistor is used as a switching element. In a commercial television set with a liquid crystal panel of a size of about three inches and a number of pixels of about 0.3 million, the aperture ratio is of the order of 30%. There is a demand that the aperture ratio be less than 10% if the number of pixels increases to one million or more in same panel size. Recently, the technology directed to thin film transistors in a liquid crystal panel has improved, and the problem of the aperture ratio is being solved by improving the precision of the mask design and process technology such as self alignment.

One of factors which affect the aperture ratio is the effect of the electric field due to source signal lines transmitting image signals to thin film transistors and due to gate signal lines transmitting signals to turn on or off the thin film transistors. The electric field changes the alignment of liquid crystal molecules in a twisted nematic type panel irrespective of the image signals, and a part of an image to be displayed vanishes around the periphery of pixels. Then, in order to prevent partial vanishing of the image, a shading pattern called as black matrix is provided on a substrate opposed as the other substrate on which pixel electrodes are formed. The shading pattern decreases the aperture ratio.

In order to solve problems related to the aperture ratio, a liquid crystal panel, with use of twisted nematic liquid crystal and reflection type pixels, and a projection type television with use of the panel have been fabricated (Proceedings of the 9-th International Display Research Conference (JAPAN DISPLAY '89) p584–587). In the liquid crystal panel, reflection electrodes are formed on thin film transistors, so that the area occupied by the thin film transistors is prevented from decreasing the aperture ratio due to the existence of the thin film transistors. Further, signal lines are formed below the reflection electrodes, so that the vanishing of a partial image due to the electric field of the signal lines can be prevented. Thus, the aperture ratio increases to 70% even though the pixel size is very small or 30×35 μm.

However, this panel structure has problems. As explained above, the reflection electrodes are formed via an insulator film on the thin film transistors. Therefore, the pattern of the thin film transistors are transferred to the reflection electrodes, and the surface of the reflection electrodes becomes uneven even though the reflection electrodes are expected to have a specular surface. In order to prevent the unevenness, the thickness of the insulator film may be increased. However, such a thick film makes it difficult to form contact holes for electrical connection to the reflection electrodes. Further, the surface becomes very uneven at the contact holes. On the other hand, the thickness of the reflection electrodes may be increased. However, this increases the deposition time of a metallic film for the reflection electrode. Further, it becomes difficult to separate adjacent reflection electrodes on the patterning step. Another problem is with respect to the rubbing needed for the twisted nematic liquid crystal panel because a rubbing cloth is caught at peripheral parts of the reflection electrodes to make the alignment around the peripheral parts poor. Further, the rubbing pressure may break edges of the reflection electrodes and the generated fragments of the reflection electrodes may cause a short-circuit between reflection electrodes. Thus, the above-mentioned liquid crystal panel has an advantage of high aperture ratio, but it is difficult to display an image at a high luminance and the alignment of liquid crystal molecules are liable to become worse.

A twisted nematic type liquid crystal display also has a problem in that a polarized beam splitter is needed to construct a projection type television. The polarized beam splitter has a narrow angle range for incident light and its cost is high. Further, only one of P and S components can be used for a projection light. Thus, a projected image becomes darker.

SUMMARY OF THE INVENTION

An object of the present invention is to provide a liquid crystal panel of high luminance and high contrast.

Another object of the present invention is to provide a projection type television which can form an image of high luminance and high contrast.

In a liquid crystal panel according to the present invention, a liquid crystal/resin composite layer is interposed between pixel electrodes and a reflection electrode such as a metallic thin film. The transparent pixel electrodes and switching elements for applying signals to the pixel electrodes are formed on a surface of a first substrate, while the reflection electrode is formed on a surface of a second substrate. The liquid crystal/resin composite scatters or transmits the incident light according to the applied voltage. The incident light need not be a polarized light and a display of illuminance is double or more that of a twisted nematic type liquid crystal panel.

A grating consisting of protrusions is formed on the reflection electrode or on the pixel electrodes to improve the contrast further. The grating can be fabricated easily because the reflection electrode or the pixel electrodes have a smooth surface. The refractive index $n_k$ of the grating coincides for example with the normal refractive index $n_o$ of the liquid crystal component of the liquid crystal/resin composite, and the refractive index $n_p$ of the resin component is also chosen to agree with $n_o$. Thus, the incident light is diffracted in the scattering state, while it propagates straightly in the transmission state because the grating vanishes. Thus, a ratio of the transmitted light between the transmission and scattering states or the contrast is improved.

Preferably, pixel electrodes have an anti-reflection structure. Further, an anti-reflection film is formed, or an uneven substrate or a wedge-like prism is arranged on the plane to which the light is incident.

A projection type liquid crystal television of the present invention comprises a light source such as a metal halide lamp, a lens system for illuminating the light from the light source, three above-mentioned liquid crystal panels for modulating the light from the lens system and a projection lens system for projecting the modulated light to a screen. The light from the liquid crystal panel is separated into three light paths for the three primary colors of red, green and blue, and the three liquid crystal panels are arranged in each optical path.

An advantage of the present invention is that the luminance of the image is high and that the contrast of the image is improved.

Another advantage of the present invention is that the life of the panel can be extended.

BRIEF DESCRIPTION OF THE DRAWINGS

These and other objects and features of the present invention will become clear from the following description taken in conjunction with the preferred embodiments thereof with reference to the accompanying drawings, in which:

FIG. 16 is a schematic diagram of a projection type television system.

DETAILED DESCRIPTION OF THE PREFERRED EMBODIMENTS

Figure 1:
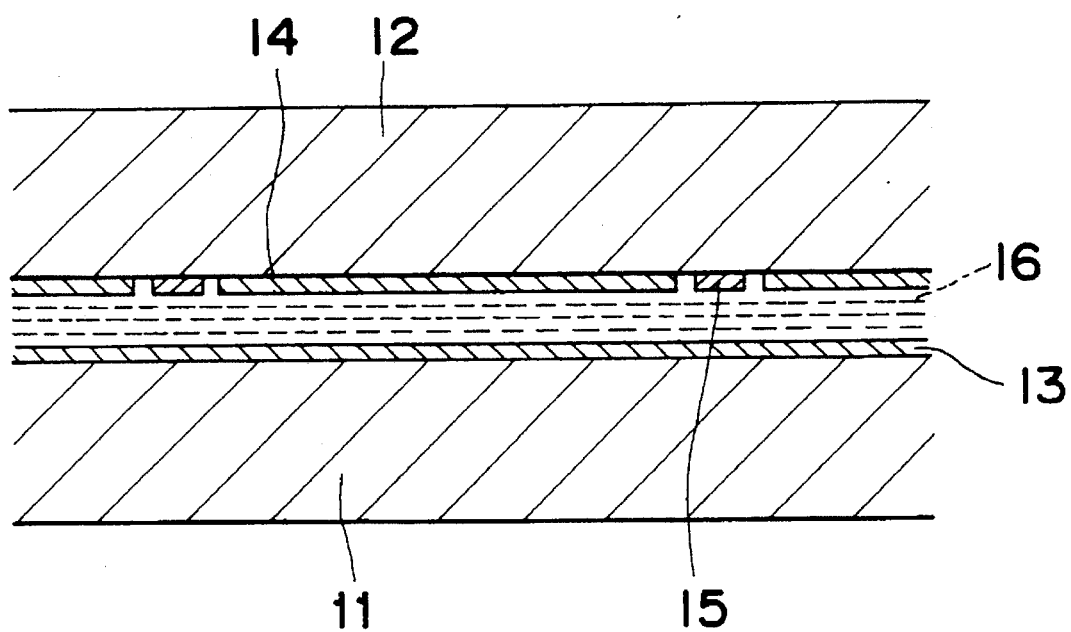
FIG. 1 is a schematic sectional view of a liquid crystal panel of a first embodiment of the present invention.

Referring now to the drawings, wherein like reference characters designate like or corresponding parts, embodiments of the present invention will be explained below.

Figure 13:
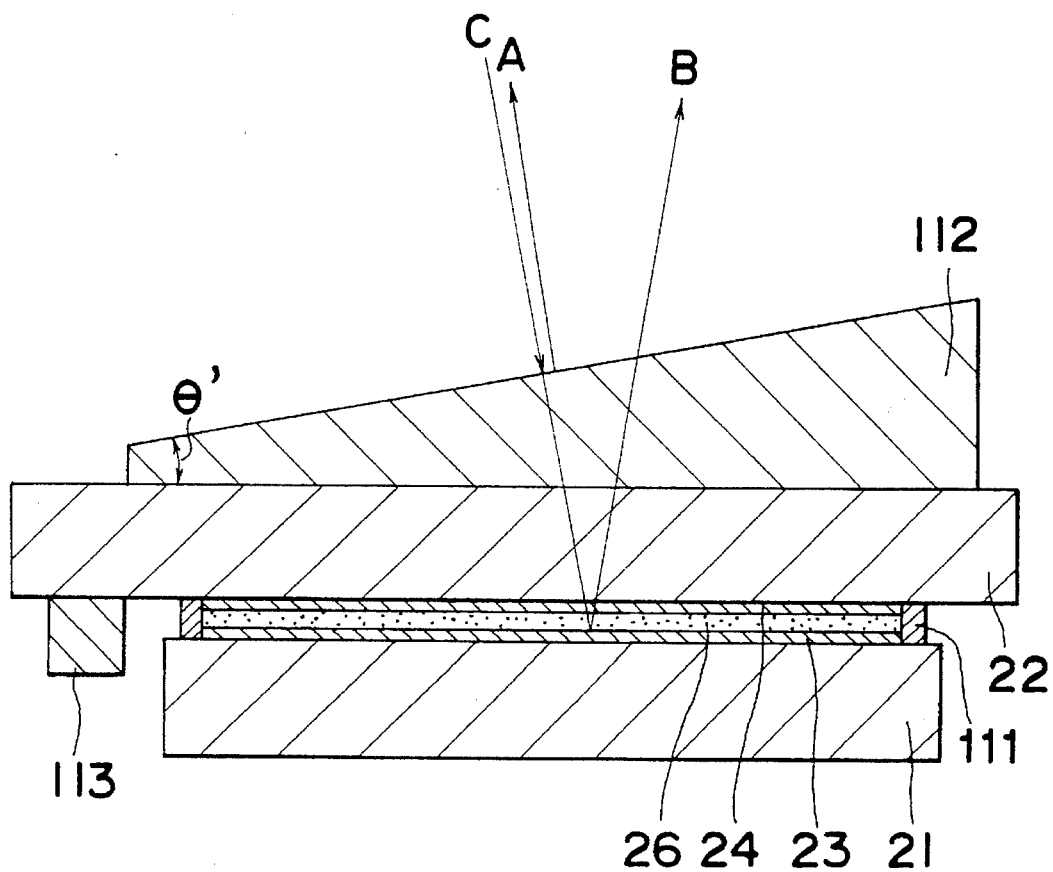
FIG. 13 is a schematic sectional view of a part of a liquid crystal panel having a layer with a non-parallel surface.

FIG. 1 shows a liquid crystal panel according to a first embodiment of the present invention schematically. The liquid crystal panel comprises a liquid crystal layer 26 interposed between pixel electrodes 14 and a reflection electrode 13 such as a metallic thin film. The transparent pixel electrodes 14 and switching elements 15 for applying signals to the pixel electrodes 14 are formed on a surface of a first substrate 12, while the reflection electrode 13 is formed on a surface of a second substrate 11. The liquid crystal layer 26 is made of liquid crystal/resin composite which scatters or transmits the incident light according to the applied voltage. The incident light is need not be a polarized light and a display of illuminance increases to double or more that of a twisted nematic type liquid crystal panel. A seal 111 for sealing the liquid crystal/resin composite and drive ICs 113 for driving the thin film transistors as shown in FIG. 13 are used in the panel, but they are not illustrated in FIG. 1.

The counter electrode or the reflection electrode 13 has a very smooth surface because active elements are not formed below the reflection electrode 13 in this structure. By using the deposition of aluminum, the reflectance of the incident light increases to about 90%. In a prior art twisted nematic type panel, the reflectance cannot be increased so high because the pixel electrodes are used as reflection electrodes.

The liquid crystal/resin composite in the liquid crystal layer 26 transmits light when liquid crystal molecules align along an electric line of force generated between the pixel electrodes 14 and the reflection electrode 13. On the other hand, electric lines of force are generated between the signal lines and the pixel electrodes 14 in parallel in regions between pixel electrodes, and the incident light is not transmitted through the regions. Therefore, a partial vanishing of image does not happen in the regions between the pixels, in contrast to the twisted nematic type display, and the aperture ratio is improved.

The liquid crystal/resin composite used in the present invention is explained next. The liquid crystal/resin composite is a composite of a liquid crystal component and a resin component, and the liquid crystal component exists in the matrix of the resin (polymer) component. The structure of the liquid crystal/resin composite changes according to the ratio of the liquid crystal component to the resin component, and it is classified typically into two types according to the ratio. In one type of the composite having a small ratio, droplets of liquid crystal are dispersed in the voids of the resin matrix, or the liquid crystal component exists discontinuously. This type is called as polymer dispersed liquid crystal. If the amount of the liquid crystal component is increased, droplets contact with each other. In the other type having a large ratio, a network of the resin component is formed, while the liquid crystal component does not exist as droplets, but extends continuously in the network of the resin component. This structure is analogous to a sponge impregnated with liquid crystal. This type is called as polymer network liquid crystal.

In the preparation of the liquid crystal/resin composite, independent particle-like droplets of liquid crystals are formed in a resin layer when the amount of the liquid crystal component is smaller than that of the resin component. On the other hand, when the amount of liquid crystal component is larger than that of the resin component, a resin matrix or network is formed in the liquid crystal material as a continuous layer. Although a liquid crystal panel with use of the polymer dispersed liquid crystal is taken mainly as examples in the following embodiments for simplicity of the explanation, either of the liquid crystal panels using a polymer dispersed liquid crystal or a polymer network liquid crystal can be used in the present invention to display an image by controlling the scattering and transmission of light in the present invention.

A liquid crystal panel with use of the polymer dispersed liquid crystal uses a property in which the refractive index of the liquid crystal varies with the orientation direction of the liquid crystal molecules. An image is displayed by controlling the scattering and the transmission of incident light. Usually, when no voltage is applied, the light is not transmitted (scattering mode). Without applying a voltage to the liquid crystal, the liquid crystal molecules in the droplets align in irregular directions. In this state, a difference in refractive index exists between the liquid crystal and the resin to scatter the incident light. When a voltage is applied to the liquid crystal, the light is transmitted (transmission mode) or the liquid crystal molecules are aligned in a direction. If the refractive index of the liquid crystal composition oriented in the direction is controlled preliminarily to coincide with that of the resin component, the incident light is not scattered in the liquid crystal, but transmits through the liquid crystal.

The liquid crystal panel uses an electro-optic effect as explained further with reference to FIGS. 2(a) and (b). Reference numeral 17 denotes droplets of liquid crystal, while reference numeral 18 denotes a resin. Thin film transistors and other circuit components are connected to the pixel electrodes 14 on the array substrate 12, and the thin film transistors are turned on or off according to the voltage applied to the pixel electrodes 14. The orientation direction of the molecules in the droplets 17 dispersed in the resin 18 varies with the voltage applied between the pixel electrode 14 and the counterelectrode 13 to thereby modulate the incident light.

FIG. 2(a) shows schematically a scattering state ("OFF" state) where no voltage is applied, and the liquid crystal molecules in the droplets 17 orient in random directions. In this case, a difference in the refractive index exists between the resin 18 and the droplets 17 to scatter the incident light. It is noted here that a common voltage is applied to the counterelectrode 13. As shown in FIG. 2(b), when a voltage is applied to the pixel electrode 14, the liquid crystal molecules are aligned in one direction. By controlling preliminarily the refractive index of the droplets oriented in the direction to coincide with that of the resin, the incident light is not scattered in the droplets 17, but reflected by the reflection electrode 13, and further transmits outward through the array substrate 12 (transmission state or "ON" state).

In contrast, the polymer network liquid crystal uses the irregularity itself of the orientation of the liquid crystal molecules for scattering the light. In the irregular orientation state, or without applying a voltage to the liquid crystal, the incident light is scattered through the liquid crystal, while when the molecules align in a direction by applying a voltage to the liquid crystal, the light transmits through the liquid crystal.

Preferably, the liquid crystal component for the panel is a nematic liquid crystal, a smectic liquid crystal, or a cholesteric liquid crystal. The liquid crystal may consist of a single compound or a mixture of two or more liquid crystals, or a mixture further including a substance other than liquid crystal compounds. Among the above-mentioned liquid crystal materials, cyanobiphenyl group nematic liquid crystals are preferable because they have a large difference between the normal refractive index $n_o$ and the anomalous one $n_e$.

Preferably, the resin material is a transparent resin, and any of thermoplastic resin, thermosetting resin, and photosetting resin may be used. An ultraviolet-setting resin such as an ultraviolet-setting acrylic resin is preferable because it can be easily produced and well separated from the liquid crystal phase. Particularly, a resin is preferable which contains acrylic monomers or acrylic oligomers which can be polymerized and set by ultraviolet ray irradiation.

A monomer for the polymer phase (resin) may be 2-ethylhexyl acrylate, 2-hydroxyethyl acrylate, neopentyl glycol dacryolith, hexanediol dacryolith, diethylene glycol dacryolith, tripropylene glycol dacryolith, polyethylene glycol dacryolith, trimethylol propane triacrylate, pentaerythritol acrylate or the like. An oligomer or prepolymer for the polymer phase may be polyester acrylate, epoxy acrylate, polyurethane acrylate or the like.

In order to enhance the polymerization rate, a polymerization initiator may be used such as a 2-hydroxy-2-methyl-1-phenylpropane-1-on ("DAROCURE 1173" available from Merck & Corp. Inc.), 1-(4-isopropylphenyl)-2-hydroxy-2-methylpropane-1-on ("DAROCURE 1116" available from Merck & Corp. Inc.), 1-hydroxy cyclohexyl phenylketone ("Irgacure 651" available from Ciba-Geigy AG) or the like. Furthermore, a chain transfer agent, a photosensitizer, a dye agent, a crosslinking agent or the like may be appropriately incorporated as an additional ingredient.

A liquid crystal is dissolved homogeneously in an ultraviolet ray setting resin to form a liquid or viscous mixture. The mixture is injected between the two substrates 11 and 12, and next it is irradiated with ultraviolet rays. Thus, only the resin material is isolated to form a liquid crystal/resin composite 26.

The ratio of the liquid crystal component to the resin component in the liquid crystal/resin composite is generally 20 to 90 wt %, preferably 50–80 wt %. If the ratio is less than 20 wt %, the amount of liquid crystal droplets is small so that the effect of a change of the refractive index is small. On the other hand, if the ratio is more than 90 wt %, there is a tendency that the resin component and the liquid crystal component are separated from each other into top and bottom layers, so that the ratio of the interface decreases to lower the scattering property of the liquid crystal layer. The structure of the liquid crystal/resin composite depends on the ratio. If the ratio is less than 50 wt %, the liquid crystal component exists as droplets, while if it is 50 wt % or more, a continuous phase appears wherein the resin and liquid crystal components are tangled with each other.

The nonuniform electric field generated around the thin film transistors when an electric field is applied contributes to the scattering of the light. Therefore, it does not give rise to poor effects on the display quality in contrast to a twisted nematic type liquid crystal panel. Because the alignment film and the rubbing thereof are not needed for a liquid crystal/resin composite, the alignment processing at the periphery around the reflection electrode which may cause problems is not needed in contrast to a prior art reflection type panel.

The above-mentioned liquid crystal/resin composite does not need a polarizer and an analyzer for modulating the light, in contrast to nematic liquid crystal in the twisted nematic type liquid crystal display. Therefore, it can display at a high luminance of twice or more when compared with a liquid crystal panel using a twisted nematic type liquid crystal.

The thickness of the liquid crystal layer 16 is selected between 2 to 20 μm, preferably 3 to 15 μm for the scattering characteristics and the applied voltage of the liquid crystal layer. The thickness is set to obtain 90% of maximum transmittance at an applied voltage of 6 to 8 V.

In case of a reflection type liquid crystal panel, the incident light is scattered twice by the liquid crystal layer 16 both when entering the layer 26 and after reflected by the reflection electrode 13. Therefore, the contrast of the display can be improved relative to that of a transmission type liquid crystal panel. Further, the scattering transmission characteristic which is the same as that of the transmission type liquid crystal panel can be realized for a liquid crystal layer thickness which is a half that of the transmission type liquid crystal panel. Further, the driving voltage can be decreased so that the dissipation of power can be decreased.

Figure 3:
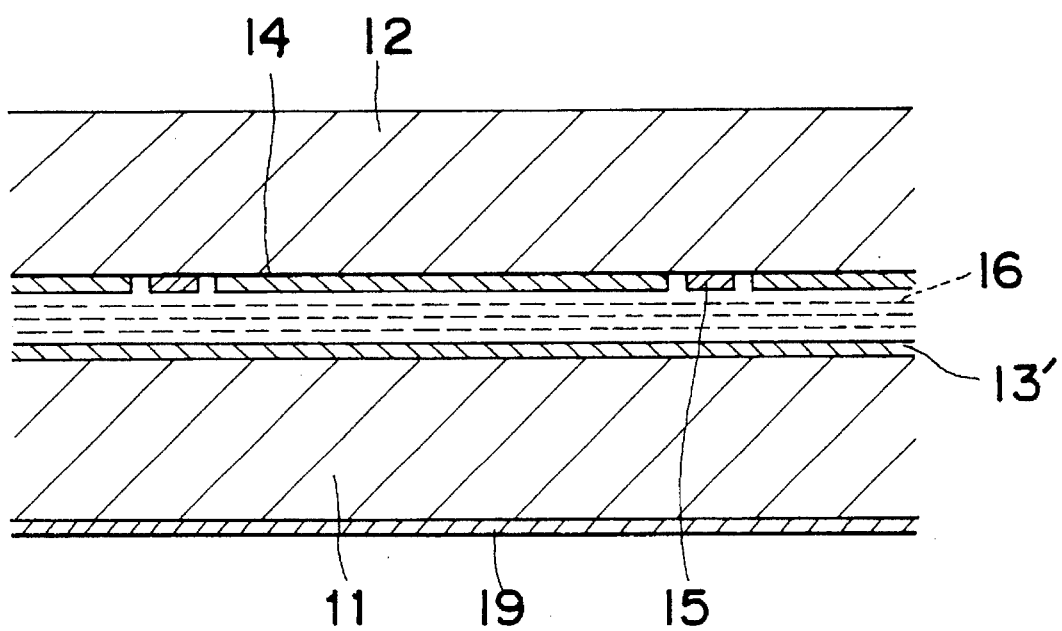
FIG. 3 is a schematic sectional view of a liquid crystal panel of a modified embodiment of the present invention.

FIG. 3 shows a modified example wherein a reflection film 19 is formed on the counterelectrode substrate 11 at the outside, and a counter electrode 13' formed at the inside is made of a transparent material. The incident light transmits the array substrate 12, the pixel electrodes 14, the liquid crystal layer 16, the counter electrode 13 and the counter substrate 11 and is reflected by the reflection film 19.

Figure 4A:
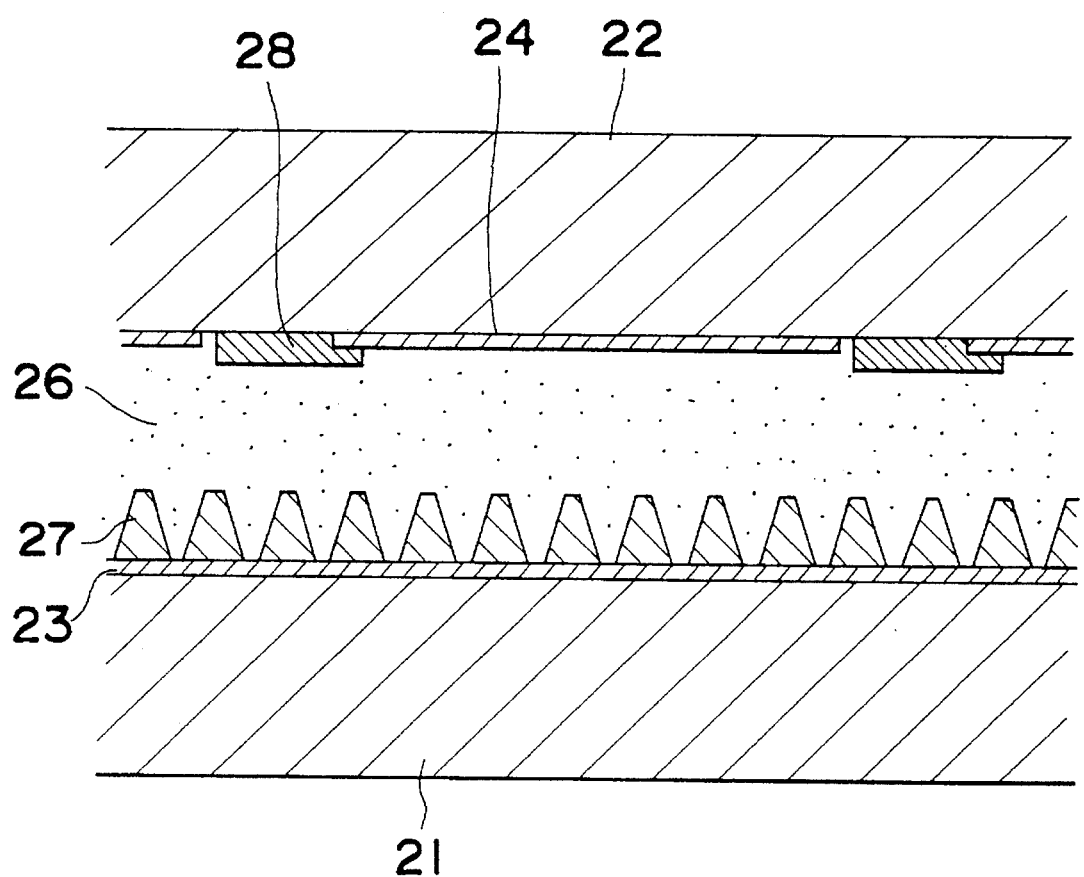
FIGS. 4(a) and (b) are schematic sectional views of liquid crystal panels of a second embodiment of the present invention.

FIG. 4($a$) illustrates a schematic sectional view of a liquid crystal panel of a second embodiment. Pixel electrodes 24, thin film transistors 28 as switching elements and source signal lines (not shown) and the like are formed on an array substrate 22. The pixel electrodes 24 are made of indium tin oxide (ITO) or the like and transmit light. On the other hand, a metallic thin film made of aluminum or the like is formed on a counterelectrode substrate 21, and it plays a role as a reflection electrode 23 as well as a counterelectrode. A liquid crystal layer 26 made of liquid crystal/resin composite is interposed between the two substrates 21 and 22. A grating 27 or 29 consisting of protrusions arranged regularly is formed on the reflection electrode 23, and this is a characteristic of this liquid crystal panel.

The counter electrode or the reflection electrode 23 has a very smooth surface because active elements are not formed below the reflection electrode 23 in this structure, as in FIG. 1. By using the deposition of aluminum, the reflectance of the incident light increases to about 90%.

Figure 5:
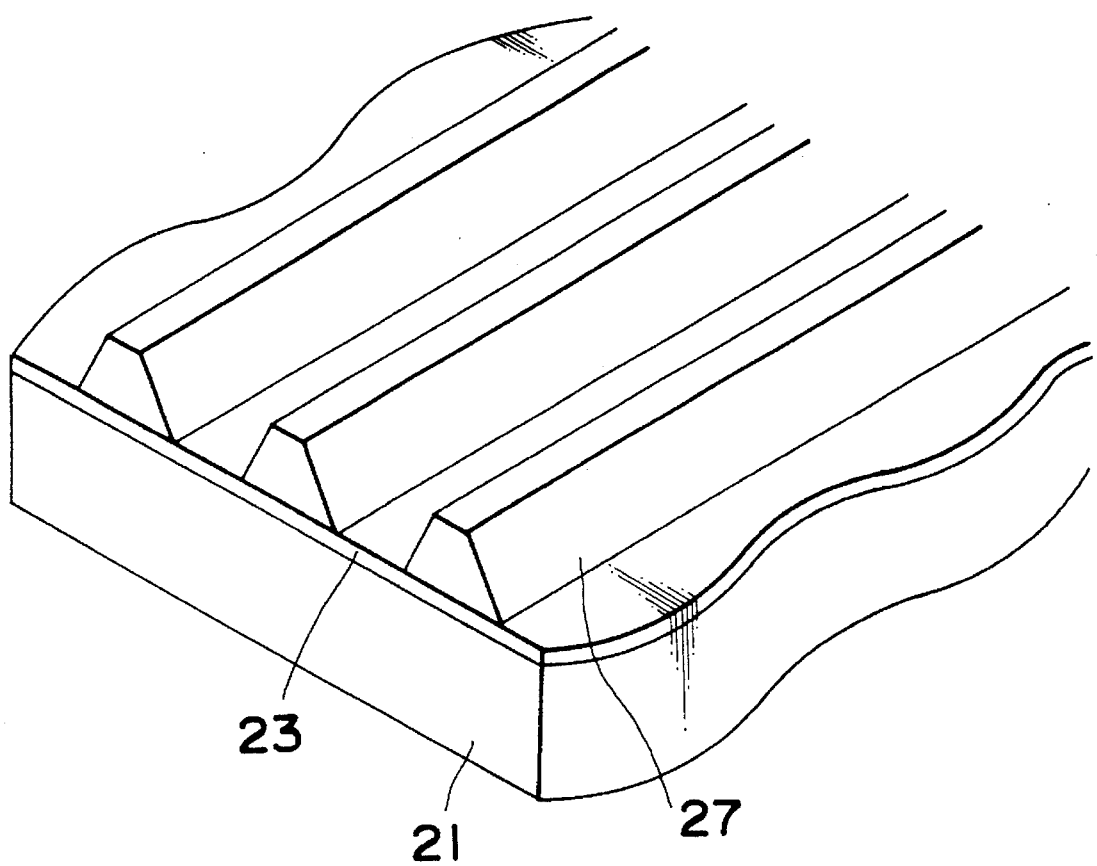
FIG. 5 is a perspective view of a one-dimensional grating.
Figure 6:
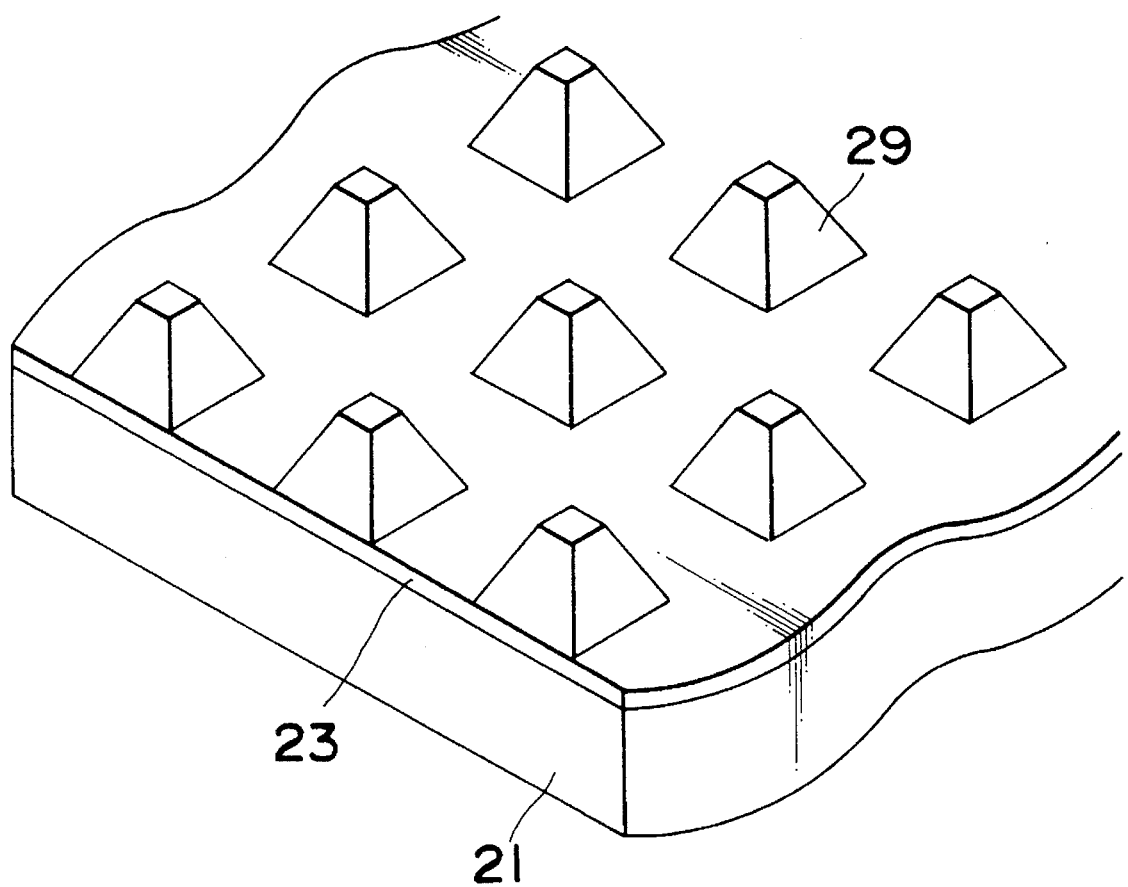
FIG. 6 is a perspective view of a two-dimensional grating.

FIG. 5 displays a one-dimensional grating 27 in a perspective view. The grating 27 is made of trapezoidal lines. However, the shape of each line of the grating may be saw-teeth-like, triangular, sine-wave-like, rectangular or the like. Further, a two dimensional grating 29 such as an array of truncated pyramids shown in FIG. 6 may also be used instead of the one-dimensional grating 27. The pitch of the protrusions in the grating 27, 29 is preferably between 1 and 20 μm, more preferably between 2 to 10 μm, while the height thereof is preferably between 0.5 to 8 μm, more preferably between 1 to 5 μm.

The grating 27, 29 may be made of an inorganic material such as $SiO_x$, $SiN_x$, $TaO_x$ or a glass, or of an organic material such as polyimide or an acrylic resin. The material is selected according no the refractive index of the resin component in the liquid crystal/resin composite. Usually, the normal refractive index $n_o$ of the liquid crystal is 1.45 to 1.55, the anomalous refractive index $n_e$ thereof is 1.65 to 1.80, and the refractive index $n_p$ of the resin is 1.45 to 1.55. In many cases, $n_p \approx n_o$.

Figure 2:
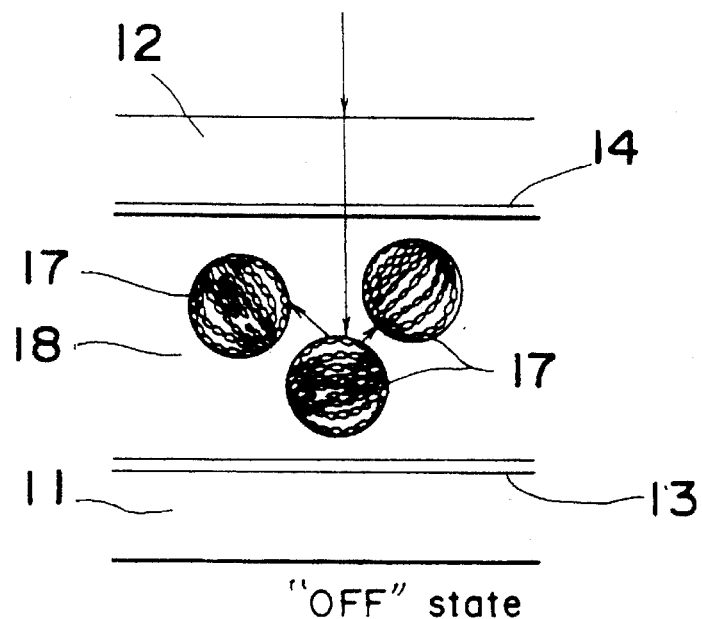
FIGS. 2(a) and (b) are diagrams for illustrating a liquid crystal/resin composite.
Figure 2:
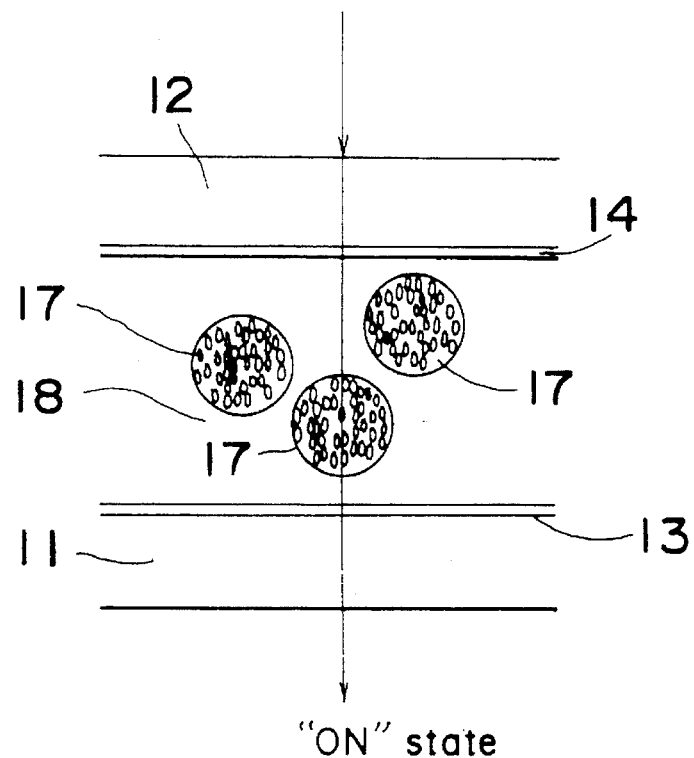

For example, if a liquid crystal material of positive dielectric anisotropy is used, the refractive index $n_{off}$ of the liquid crystal layer 26 in the scattering state (refer FIG. 2($a$)) can be expressed for example as $(2 \times n_o + n_e)/3$. On the other hand, the refractive index $n_{on}$ in the transmission state (refer FIG. 2($b$)) is equal to $n_o$. Therefore, in order to generate a grating in the scattering state and to vanish it in the transmission state, the refractive index $n_k$ of the grating is required to agree roughly with $n_p$ of the resin. In the scattering state, $n_{off}=(2 \times n_o+n_e)/3$, and $n_k \neq n_{off}$. Thus, a difference $\Delta n$ of refractive index arises between the grating 27, 29 and the liquid crystal layer 26. On the contrary, the refractive index $n_{on}$ of the liquid crystal layer 26 is $n_o$ in the transmission state, and $n_k=n_p$ if $n_o=n_p$. That is, there is no difference of refractive index between the grating 27, 29 and the liquid crystal layer 26, and the grating 27, 29 vanishes. It is desirable that the difference of the refractive index $n_k$ of the grating with that $n_p$ of the liquid crystal layer 26 is 0.1 or less. Then, among inorganic materials, $SiO_2$ which can be formed easily is appropriate for a material of the grating. The refractive index of $SiO_2$ is usually 1.45 to 1.50, and a grating can be formed by depositing a $SiO_2$ film and a pattern mask thereon and by etching the $SiO_2$ film.

Further, the grating 27, 29 may also be formed on a glass substrate directly with photolithography and dry etching. Among organic materials, the same transparent polymer as the resin component in the liquid crystal layer is most suitable. Further, an ordinary resist material used for fabricating a semiconductor may also be used. The grating 27, 29 may also be fabricated by coating the material with a roll coater, a spinner or the like on a substrate and by polymerizing only desired portions with use of a pattern mask or the like. Further, it may also be fabricated with dry development by coating a photosensitive resin made from a polymer and a dopant on a substrate, by exposing it with a mask and by subliming the dopant with heating under reduced pressure.

The pitch "p" and the height "d" of the protrusions of the grating 27, 29 depend on the wavelength λ of the light to be modulated, the refractive index of the liquid crystal layer 26, the directivity of the light in the optical system and the desired diffraction efficiency. That is, the pitch "p" and the height "d" are selected according to the wavelength λ of the light to be modulated, the directivity of the light in the optical system, the diffraction angle θ and the wavelength λ. However, they also depend on the process conditions on forming the grating.

Figure 7:
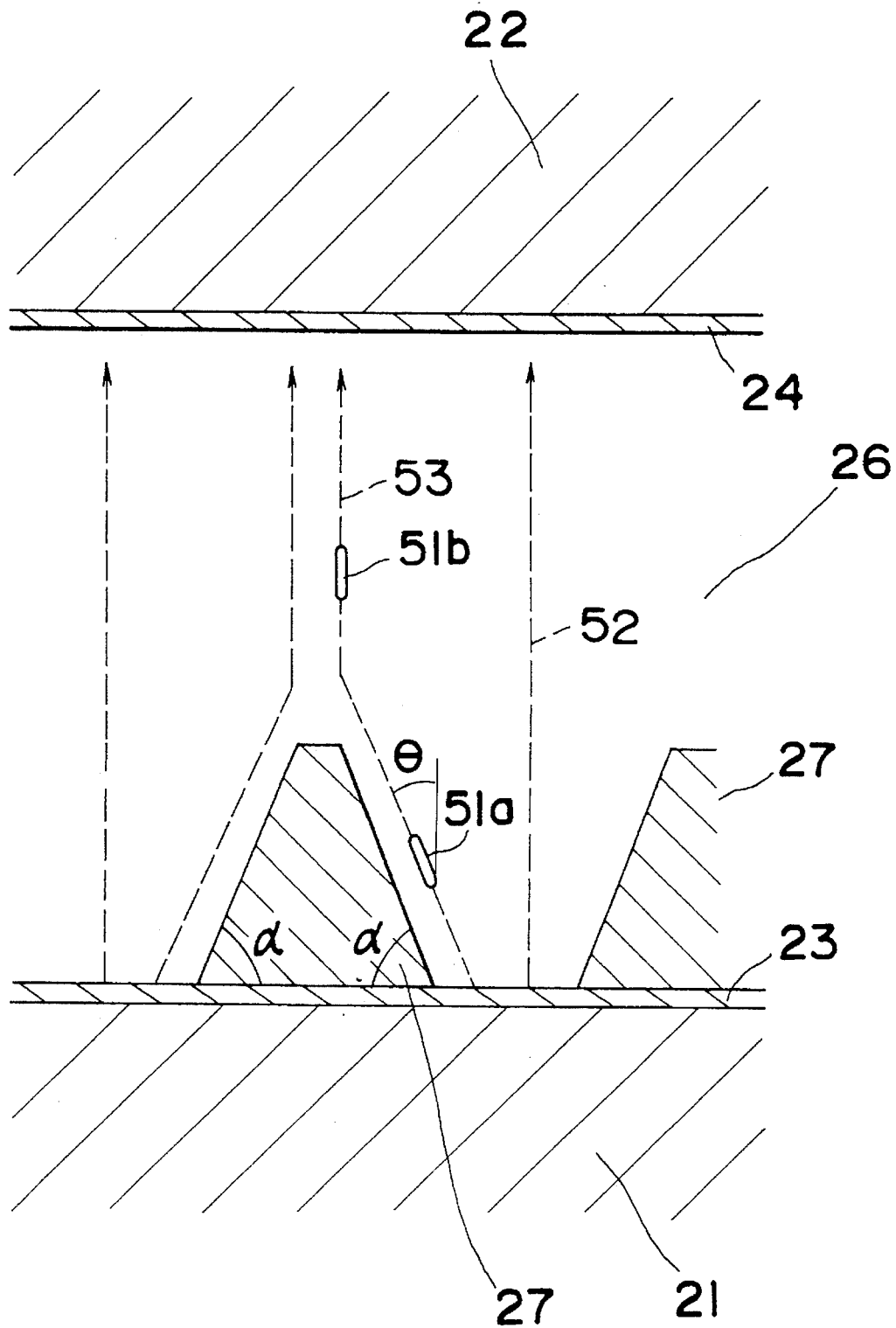
FIG. 7 is a schematic diagram of electric lines of force around the grating.

If the inclination angle α of the protrusions (the trapezoidal lines or truncated pyramids) of the grating 27, 29, defined as shown in FIG. 7, becomes perpendicular against the normal of the counterelectrode substrate 21, the electric lines of force also become perpendiculars. Then, the refractive index of the liquid crystal layer $n_{on}=n_o$, or $n_k=n_o$. That is, if the pitch is short and the height is high, the inclination angle α of the protrusions becomes large, and the electric lines of force are generated along a normal of the counterelectrode substrate 21.

Usually, the pitch "p" is 1 to 15 μm, preferably 1 to 10 μm. If the liquid crystal panel described above is used for a projection type television set as shown in FIG. 16, the pitch has to be determined by taking into account the F value of a projection lens included in the television set. The pitch "p" is 5 μm or less for F value of 5.0, and 8 μm or less for F value of 7.0. The shape of the lines of the grating 27 is likely to be sine-wave-like or trapezoidal according to the process conditions.

The height "d" depends largely on the diffraction efficiency. The height "d" is required to be 2 to 5 μm in order to vanish the zero-dimensional light. However, usually the zero-dimensional light need not vanish completely and the diffraction efficiency may be 40–70%. Therefore, the height "d" may be 2 to 3 μm.

The inclination angle α of the protrusions of the grating 27, 29 is limited by the following conditions. FIG. 7 shows electric lines of force around the protrusions of the crating 27, 29 schematically. For simplicity of explanation, electric lines of force are assumed to start from the reflection electrode 23 and to reach to the pixel electrodes 24. An electric line of force 52 starting from the reflection electrode 23 between two adjacent protrusions extends vertically or along a normal of the reflection electrode 23. However, an electric line of force 53 starting from near the protrusions extends along the side slope of the protrusions, and it has an angle θ against a normal of the pixel electrodes 24. This arises because the dielectric constant $\epsilon_e$ of the liquid crystal layer 26 differs from $\epsilon_k$ of the grating 27, 29. The dielectric constant $\epsilon_e$ of the liquid crystal layer 26 is usually 15 to 25 though it varies between the transmission and scattering states. On the other hand, the specific dielectric constant $\epsilon_k$ of the grating 27 is usually 4 to 6. That is, electric lines of force are likely to pass not in the grating, but in the liquid crystal.

Liquid crystal molecules align along electric lines of force if the applied electric field is larger than a certain value. Further, the refractive index varies with an alignment direction of liquid crystal molecules. If liquid crystal molecules align in parallel to the normal of the counterelectrode substrate 21 or θ=0, the refractive index of the liquid crystal is $n_o$. (The angle θ is defined as an angle between the normal and the electric line of force.) On the other hand, if θ=90°, the refractive index is $(n_o=n_e)/2$ roughly. The refractive index has an intermediate value between 0° and 90° of θ. Thus, a liquid crystal molecule 51b has the refractive index $n_o$ because θ=0, while another 51a has an intermediate value between $n_o$ and $(n_o+n_e)/2$. The dielectric constant $\epsilon_k$ of the material of the grating 27, 29 is equal to 4 to 6, while the dielectric constant of the liquid crystal is equal to 15 to 25. Therefore, the electric lines of force starting from the counter electrode 21 have difficulty in to transmitting the grating 27, 29, but easily to transmit the liquid crystal layer 26. Thus, a part of the electric lines of force propagates in parallel to the side of the protrusions of the grating 27, 29. Because liquid crystal molecules align along electric lines of force, the dielectric constant of the liquid crystal aligned along the side of the protrusions has a value between $n_{on}$ and $n_{off}$. Therefore, the dielectric constant has a distribution in the liquid crystal layer 26. Even if an electric field is applied to the liquid crystal layer 26, $n_k$ is not equal to $n_o$ in regions in the liquid crystal layer 26 or the grating 28, 29 does not vanish.

As mentioned above, in the liquid crystal panel of this embodiment, the diffraction effect is vanished by equating the refractive index of the liquid crystal between the protrusions of the grating to that of the grating 27, 29 in the transmission state in which an electric field is applied to the liquid crystal. If liquid crystal molecules align at an angle θ, the two diffractive indices do not agree with each other. However, if θ is small, the refractive index of the liquid crystal molecules can be taken as $n_o$. If the resin component is assumed not to contribute to the refractive index of the liquid crystal layer 26, the refractive index changes nonlinearly from $n_o$ for θ=0 to $(n_o+n_e)/2$ for θ= 90°, or like a sine curve roughly. That is, the refractive index of the liquid crystal can be taken as $n_o$ for θ=0 to 20°, while as $(n_o+n_e)/2$ for θ=90°. Thus, the inclination angle α of the grating 27 is set preferably at 45° or more (θ= 45° or less), more preferably 60° or more (θ=30° or less), and still more preferably 70° or more (θ=20° or less).

Therefore, the ratio p/d of the height "d" to the pitch "p" is preferably ⅓ or more preferably ½ or larger. In particular, the grating 27, 29 is formed with "p" in a range from 5 to 8 μm for d between 3 to 4 μm. Thus, θ becomes 5° to 7°, and if the liquid crystal panel is used for a projection type liquid crystal television set, a projection lens of F5 to F6 can be used.

Further, a two-dimensional grating 29 is better for the grating than a one-dimensional grating 27 as shown in FIG. 5 because a ratio of the volume of the liquid crystal layer 26 to that of the grating 29 becomes sufficiently large to enhance the number of liquid crystal molecules which can align and to increase the exposed area of the reflection electrode 23 for making it easy to apply a voltage to the liquid crystal layer 26. Further, the injection of the liquid crystal becomes easy in the fabrication process.

Figure 4B:
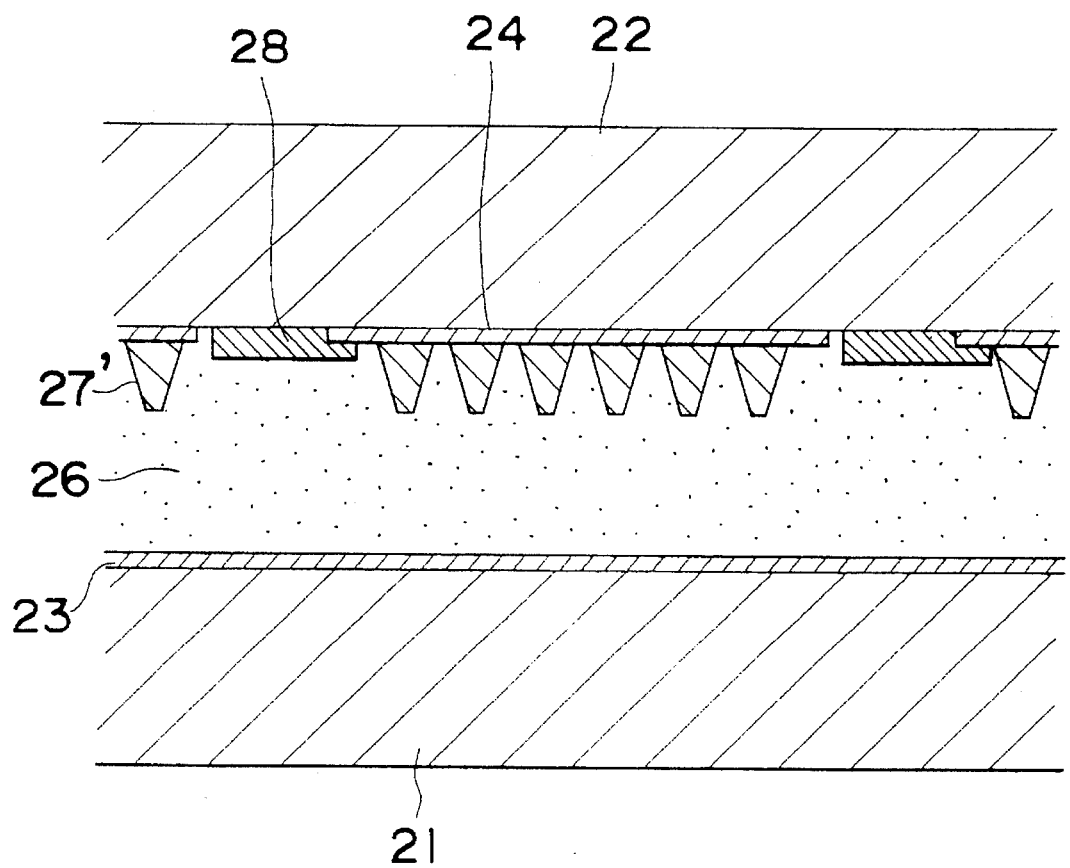

In a modified example shown in FIG. 4(b), a one-dimensional or two-dimensional grating 27' consisting of protrusions arranged regularly like the gratings 27, 29 is formed on the pixel electrodes 24 instead of on the reflection electrode 23 even though a grating can be formed on the reflection electrode 23 more easily. The structure and the action of the grating 27' are similar to those of the grating 27, 29 formed on the reflection electrodes 23, and detailed explanation on the grating 27' is not given here Next, the action of the liquid crystal panel is explained. First, in the scattering state, the grating 27, 29, 27' is generated because the refractive index $n_k$ of the grating is not equal to $n_{off}$ of the liquid crystal layer 26, and the incident light is diffracted. The diffracted light is scattered in the liquid crystal layer 26, and its optical path is bent further. Therefore, the light quantity which propagates in the liquid crystal layer 26 straightly becomes very small. On the contrary, in the transmission state, the refractive index $n_k$ of the grating is equal to that $n_{on}$ of the liquid crystal layer 26. Therefore, $n_k \approx n_p \approx n_o$, so that the liquid crystal layer 26 becomes transparent or the grating 27, 29, 27' vanishes. Therefore, the incident light propagates straightly. If an intermediate voltage between the transmission and scattering states is applied, a state intermediate as to the scattering and the transmittance of light is generated. As a result, because the grating can be generated or vanished according to the applied voltage, the display contrast can be improved.

The refractive index of the grating may be selected to equal that of the liquid crystal layer when liquid crystal molecules in the liquid crystal layer are oriented randomly even though detailed explanation in this case is not given here.

The incident light enters into the liquid crystal panel from the side of the array substrate 22, transmits the pixel electrode 24 and the liquid crystal layer 26, and is reflected by the reflection electrode 23. The reflected light transmits again the liquid crystal layer 26 and the pixel electrode 24 and exits from the array substrate 22. However, a part of the light is reflected at the interface of the array substrate 22 with air or at the interface of the pixel electrode 24 with the liquid crystal layer 26. Because such reflected light does not transmit the liquid crystal layer or it is not modulated, the display contrast is degraded. Therefore, such reflected light has to be prevented.

Several structures for preventing such unnecessary light are explained below. The structures are used for the liquid crystal panel shown in FIG. 4, but they can also be applied to the liquid crystal panel shown in FIG. 1.

Figure 8:
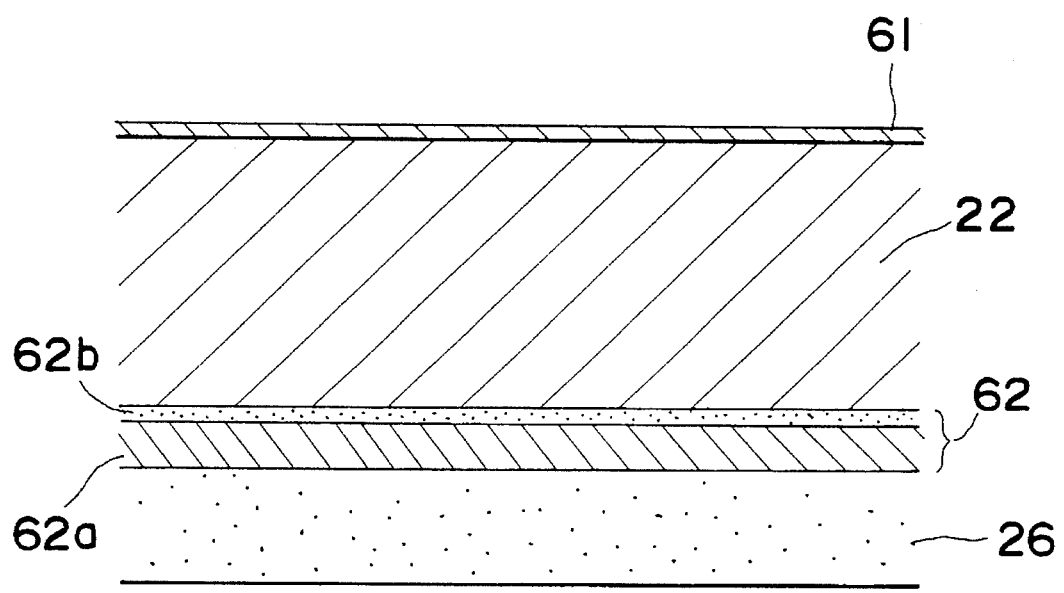
FIG. 8 is a schematic sectional view of a part of a liquid crystal panel having an anti-reflection layer.

FIG. 8 illustrates a structure for preventing unnecessary light at the interface of the pixel electrode 24 by using anti-reflection films. A pixel electrode 62 is applied to the array substrate 22, and the pixel electrode 62 has a two-layer structure consisting of a dielectric thin film 62b of $Al_2O_3$ of optical thickness of λ/4 and an ITO film 62a as a pixel electrode of optical thickness of λ/2 wherein λ denotes wavelength. The dielectric thin film 62b has a refractive index between those of the array substrate 22 and the ITO film 62a. Further, an anti-reflection film 61 made from $Y_2O_3$ and $MgF_2$ is applied to the interface of the array substrate 22 with air. The anti-reflection film 61 has an optical thickness of λ/4 to control the phase of the light.

Figure 9:
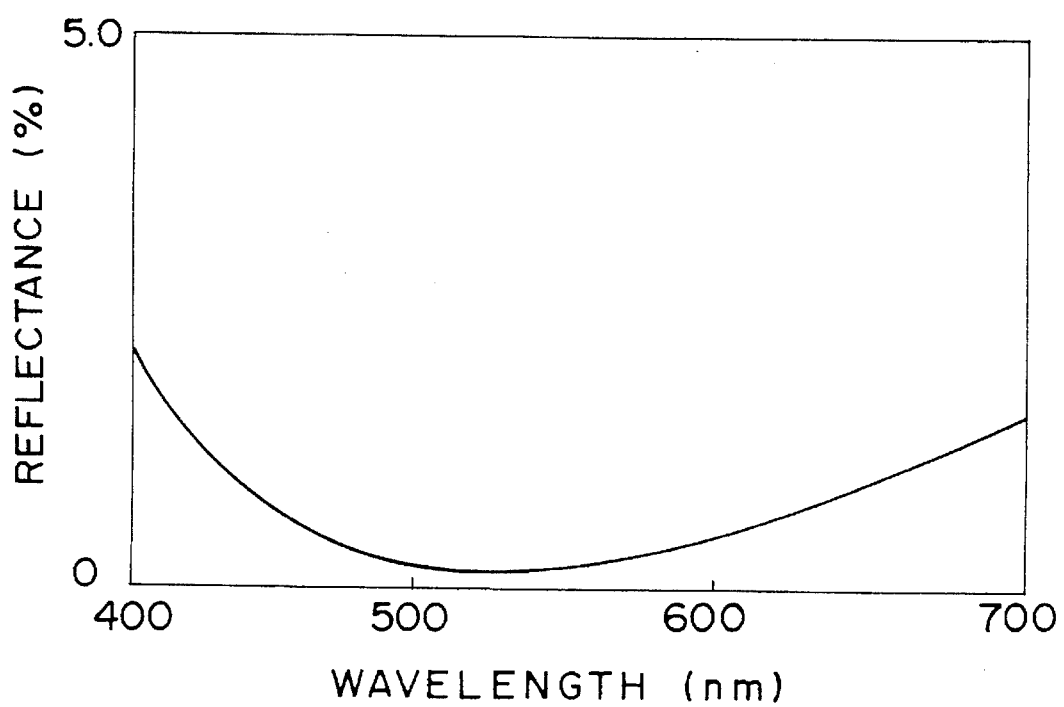
FIG. 9 is a graph of a spectral characteristic.

Table 1 shows data on the structure of this embodiment, and FIG. 9 displays the spectral reflectance thereof. FIG. 9 shows that the reflectance of 0.3% or less can be realized over a wavelength range of about 100 nm. That is, the anti-reflectance effect is substantial.

TABLE 1

| Material | Anti-reflection structure | | |
|---|---|---|---|
| | Refractive index | Optical thickness of thin film (nm) | Physical thickness of thin film (nm) |
| Glass substrate | 1.52 | — | — |
| $Al_2O_3$ | 1.62 | 130.0 | 80.2 |
| ITO | 2.00 | 260.0 | 130.0 |
| Liquid crystal | 1.60 | — | — |

NB: main wavelength λ = 520 nm.

It is desirable that the refractive index of the thin film 62b is between 1.50 and 1.70. The thin film 62b may also be made of $CeF_3$, SiO, $WO_3$, $LafF_3$ or $NdF_3$.

Figure 10:
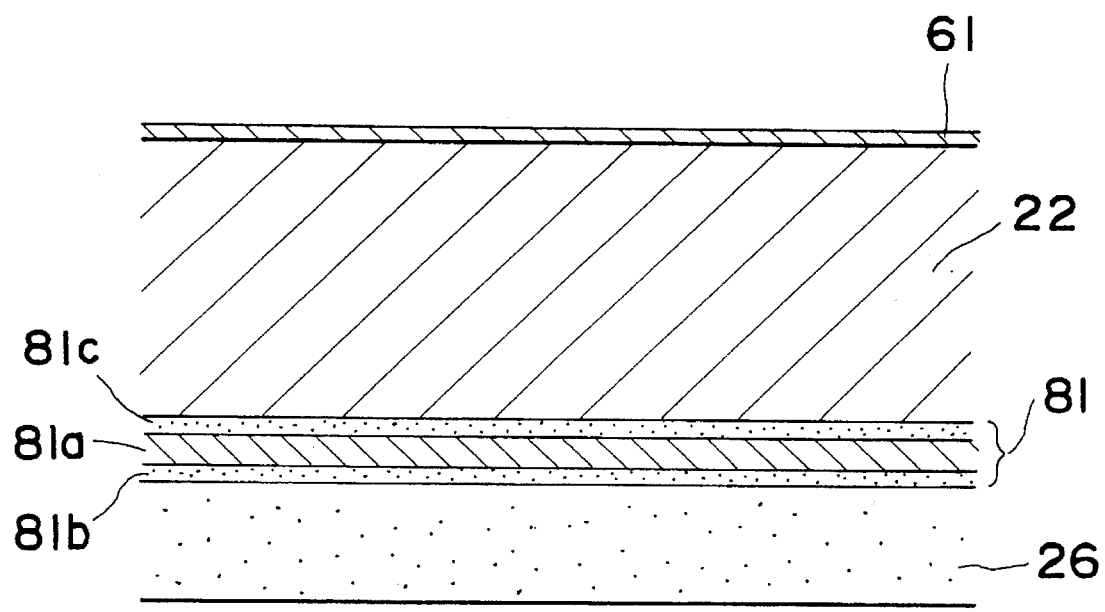
FIG. 10 is a schematic sectional view of a part of a liquid crystal panel having an anti-reflection layer.

FIG. 10 illustrates another type of anti-reflectance structure wherein a pixel electrode 81 consists of three layers of a first dielectric thin film 81c of SiO, an ITO film 81a and a second dielectric thin film 81b of SiO applied successively on the array substrate 22. The optical thickness of the ITO film 81a is λ/2, while those of the first and second dielectric films 81b and 81c are λ/4.

Figure 11:
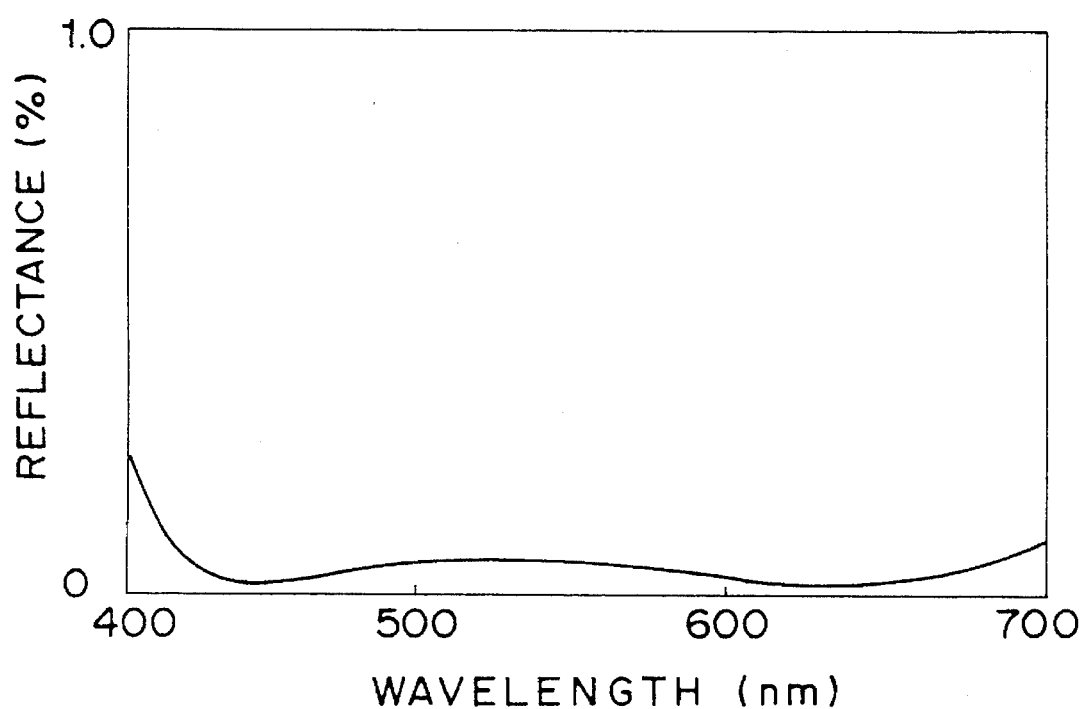
FIG. 11 is a graph of a spectral characteristic.

Table 2 shows the data on the structure of this embodiment, and FIG. 11 displays the spectral reflectance thereof. FIG. 11 shows that the reflectance of 0.3% or less can be realized over a wavelength range of about 200 nm. That is, the anti-reflectance effect is very remarkable.

TABLE 2

| Material | Anti-reflection structure | | |
|---|---|---|---|
| | Refractive index | Optical thickness of thin film (nm) | Physical thickness of thin film (nm) |
| Glass substrate | 1.52 | — | — |
| SiO | 1.70 | 130.0 | 76.5 |
| ITO | 2.00 | 260.0 | 130.0 |
| Liquid crystal | 1.60 | — | — |

NB: main wavelength λ = 520 nm.

It is desirable that the refractive indices of the first and second thin films 81c and 81b are between 1.60 and 1.80. At least one of the thin films 81c and 81b may be made of $Al_2O_3$, $Y_2O_3$, MgO, $CeF_3$, $WO_3$ or $PbF_2$ instead of SiO.

Figure 12:
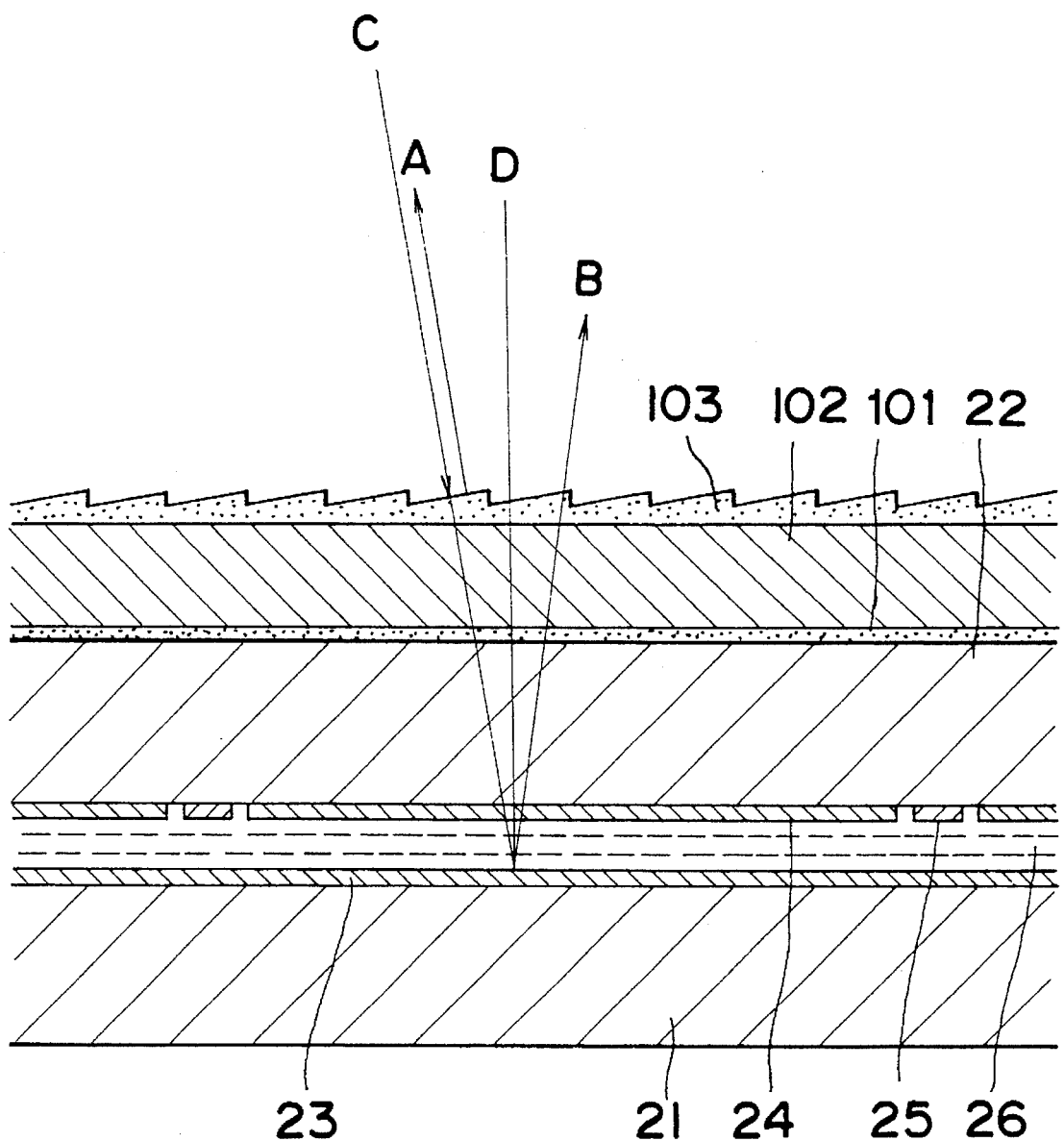
FIG. 12 is a schematic sectional view of a part of a liquid crystal panel having a layer with an uneven surface.

FIG. 12 shows a third example of anti-reflection structures. A glass substrate 102 is adhered to the array substrate 22 with an ultra-violet-ray-setting acrylic adhesive 101. A layer 103 with a saw-teethed uneven surface is formed on the glass substrate 102. The pinch of the saw-teethed layer 103 is a fifth or less of the pixel pitch, preferably an eighth or less thereof, in order to suppress the generation of Moire patterns on a screen when the liquid crystal panel is used as a light bulb of a projection type television set. For example, if the pixel pitch is 100 μm, the pitch of the saw-teeth is preferably 20 μm or less.

In order to produce a saw-teethed surface layer 103, a master plate is first produced by the exposure with an electron beam apparatus, and a stamper as a kind of die is produced with nickel electrocast process. Next, an ultra-violet-ray-setting resin is put on a glass substrate 102, and the stamper is put on the resin. Then, the resin is radiated with ultraviolet rays, to produce the saw-teethed surface layer 103.

The shape of the uneven surface of the layer 103 is not limited to saw-teeth. The saw-teethed surface may be formed directly on the glass substrate 102. The glass press technology may also be used to form an uneven surface. Further, the glass substrate 102 with the layer 103 may also be arranged above the array substrate 22 via an optical coupling means to transmit the light from the glass substrate 103 to the array substrate 22.

If a liquid crystal/resin composite is used in a reflection type liquid crystal panel, it is necessary to enter the incident light obliquely against the normal "D" of the liquid crystal panel to receive the reflected modulated light obliquely along a direction different from that of the incident light. This is because a polarized light is not available as in a twisted nematic type liquid crystal panel so that a P/S wave separator such as a polarized beam splitter cannot be used. In FIG. 12, the light enters in a direction "C", and a part thereof is reflected in the opposite direction "A". The light transmitting the uneven surface layer 103 reaches the reflection electrode 23 and is reflected in a direction "B". If a projection lens is arranged in the "B" direction, an image of high contrast is displayed.

In a modified embodiment shown in FIG. 13, a prism 112 is applied to the array substrate 22 instead of the uneven layer 103. The inclination angle θ' of the prism 112 is preferably between 4° to 15°. In other points, this liquid crystal panel is the same as that shown in FIG. 12. When the light enters in a direction "C", unnecessary reflection light in a direction "A" is reflected at a surface of the prism 112, but the reflected, modulated light proceeds in a direction "B".

If a liquid crystal panel is used as a light bulb of a projection type television set, a strong light as high as 50,000 Lx or more radiates the liquid crystal panel. The incident light enters from the array substrate 22 in the liquid crystal panel. This light warms the liquid crystal panel and causes malfunctions of drive ICs arranged at the periphery of the display region of the liquid crystal panel.

Figure 14:
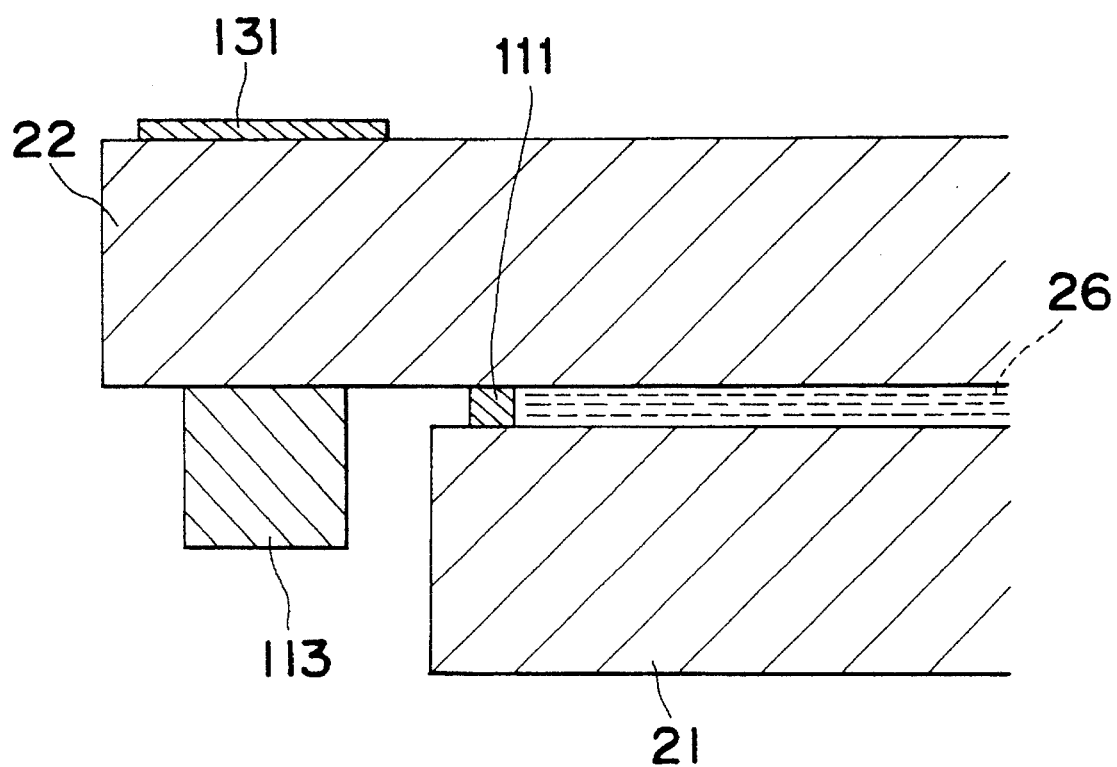
FIG. 14 is a schematic sectional view of an end part of a liquid crystal panel.

As displayed in FIG. 14, a shading film 131 may be provided at the rear surface of the array substrate 22 on which the drive ICs 113 are formed. The shading film 131 is preferably made of a metallic material such as aluminum or chromium. It may be a metallic plate.

Figure 15:
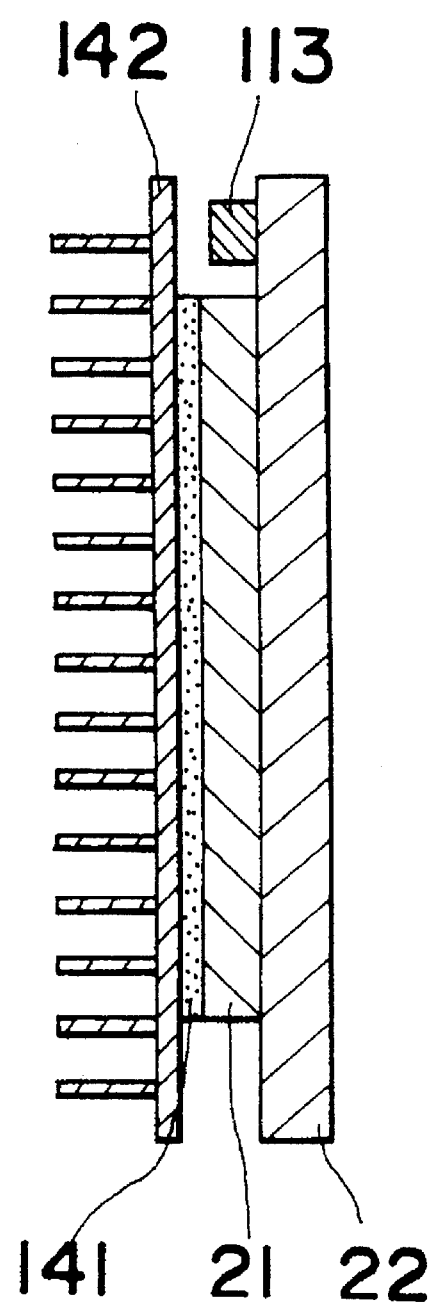
FIG. 15 is a schematic sectional view of a part of a liquid crystal panel.

In order to improve the heat radiation, a radiating plate 142 may be provided as shown in FIG. 15. The radiating plate 142 is adhered to the counterelectrode substrate 21 with a silicone adhesive 141 including thermally conducting metallic oxides. (The liquid crystal layer 26 is omitted in the drawing for simplicity of explanation.) The cooling effect is improved by the radiating plate 142. Further, the temperature distribution in the display plane becomes uniform and no display randomness due to temperature distribution arises. Moreover, in case of a reflection type liquid crystal panel, it is easy to cool it from the rear side of the panel. Therefore, the radiation plate 142 may be provided if necessary. Usually, forced cooling with a fan can cool the liquid crystal panel sufficiently. The temperature of the liquid crystal panel can be kept at 40° C. or less, and the life of the panel can be extended because the optical absorption is small.

A liquid crystal display image projection type television system of an embodiment according to the present invention will be explained below. FIG. 16 shows schematically a liquid crystal display image projection type television system with use of three liquid crystal panels 4a, 4b and 4c according to the present invention as light bulbs. It is noted here that components unnecessary for explanation are eliminated. Reference numeral 1 denotes a light convergence optical system including a concave mirror and a light source. Preferably, the light source is a metal halide lamp having a power dissipation of 120 W and an arc length of about 3 mm. The concave mirror and the F value of the projection lens can be designed to have appropriate specifications corresponding to the arc length of the lamp. For instance, the F value of the projection lens is set at about F8 when the arc length is 4 mm, or at about F10 when the arc length is 3 mm. In the present embodiment, a metal halide lamp having an arc length of 3 mm, a spherical concave mirror, and a projection lens having an F value of F10 are used.

Reflection type liquid crystal panels 4a, 4b, 4c (4) used as light bulbs are the same as that shown in FIGS. 1 or 4 except that the pixel electrodes and the like are made from a metal such as aluminum as reflection electrodes. The panels 4c, 4b and 4a modulate the red (R), green (G) and blue (B) components, respectively.

The concave mirror 1b is made of glass, and a multilayer film for reflecting visible light and transmitting infrared and ultraviolet rays are deposited on a reflection surface of the mirror. The visible components included in the light emitted from the lamp 1a are reflected on the reflection surface of the concave mirror 1b, and infrared and ultraviolet components are removed by a filter 1c from the light reflected on the concave mirror 1b.

The projection lens 2 is comprised of a first lens group 2a disposed on the side of the liquid crystal panels 4 and a second lens group 2b disposed on the side of a screen 6. Between the first and second lens groups 2a, 2b is provided a plane mirror 2c. Scattered light emitted from a pixel located at the center of each liquid crystal panel 4 is transmitted through the first lens group 2a, where a lower half of the light with respect to the optical axis 5 in the drawing is incident on the plane mirror 2c, and the remaining light is incident on the second lens group 2b instead of the plane mirror 2c. The normal of the plane mirror 2c is inclined at an angle of 45° with respect to the optical axis 5 of the projection lens 2.

The light emitted from the light source 1 is reflected on the plane mirror 2c and transmitted through the first lens group 2a to be incident on the liquid crystal panel 4. Light reflected on the liquid crystal panel 4 is transmitted through the first lens group 2a and the second lens group 2b in this order to, reach the screen 6. The optical system is designed in such a manner that a light beam emitted from the center portion of the projection lens 2 and directed along the optical axis 5 to the liquid crystal panel 4 is incident on the liquid crystal layer of the panel approximately perpendicularly, i.e., in a telecentric manner.

Reference numerals 3a, 3b, and 3c denote dichroic mirrors which concurrently serve both as a color synthesis and as a color separation system. White light emitted from the light source 1 is reflected by the plane mirror 2c to be incident on the first group 2a of the projection lens 2. In the above case, unnecessary light components are cut off by the filter 1c having its half band width of 430 nm to 690 nm. Hereinafter, each optical band is represented by its half band width value. The dichroic mirror 3a reflects the green component and transmit the red and blue components. The green component is subjected to eliminate a band by the dichroic mirror 3c to be incident on the liquid crystal panel 4b. The band of the green component is 510 to 570 nm. On the other hand, the dichroic mirror 3b reflects the blue component and transmits the red component. Similarly, the blue component is incident on the liquid crystal panel 4c, while the red component is incident on the liquid crystal panel 4a. The blue component has a band of 430 to 490 nm, while the red component has a band of 600 to 690 nm. Each liquid crystal panel forms an optical image by changing the scattering state of light according to video signals. Optical images formed by the display devices 4 of the three colors are synthesized by the dichroic mirrors 3a and 3b and then magnified and projected by the projection lens 2 on the screen 6. It is noted that band widths of the red, green and blue components have almost common values. Though dichroic mirrors are used in FIG. 16, dichroic prisms may also be used instead of dichroic mirrors.

By using the reflection type liquid crystal panel 4a, 4b, 4c having a high contrast and a high numerical aperture, a high-luminance image display can be achieved. Furthermore, since no obstacle exists behind the liquid crystal panel, the panel can be cooled easily. For instance, a forced air cooling from behind the panel can be easily utilized, or a heat sink or the like can be easily attached to the rear surface of the panel.

If the pixel electrodes have an anti-reflection electrode as shown in FIGS. 8 and 10, the reflection at the interface can be suppressed, and good contrast can be realized.

Further, a grating is formed in the liquid crystal panel, the amount of the light propagating straightly can be decreased largely in the scattering state of liquid crystal due to the scattering and diffraction effects of the liquid crystal layer. On the other hand, in the transmission state of the liquid crystal, the grating vanishes, and the incident light propagates straightly. Thus, an image display of high quality of gradation can be realized.

Because a projection type television set with use of a liquid crystal panel of the present invention, an image has high luminance and high contrast. As explained above, the counter electrode in the liquid crystal panels is made of a metallic material as a reflection electrode. Therefore, because the reflection electrode has a good specular surface, the reflection efficiency is very high. Thus, an image display of high luminance can be realized for a projection type television set with use of a liquid crystal panel of the present invention. Further, a counter electrode is made of a metallic material, the resistance is low. Thus, uneven luminance of display does not occur.

Further, by changing the average size of droplets or network pore in the liquid crystal/resin composite or the height of the grating according to the wavelengths for red, green and blue, the contrast at each of the wavelengths can be improved largely, and the quality of image can be improved. That is, the structure of the liquid crystal/resin composite liquid crystal of the liquid crystal panel is fabricated to be adjusted to the spectral characteristic of the incident light. For example, if the liquid crystal component is like droplets in the composite, the size of the droplets is large for a long wavelength, while short for a short wavelength.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the-appended claims unless they depart therefrom.

What is claimed is:

1. A liquid crystal panel comprising:
   a first transparent substrate including transparent pixel electrodes and switching elements for applying signals to said pixel electrodes, said transparent pixel electrodes and said switching elements being formed on a surface of the first substrate;
   a second substrate including a counter electrode which is made of a reflection film for reflecting incident light, said counter electrode being formed on a surface of said second substrate confronting said surface of said first substrate;
   a liquid crystal layer interposed between said pixel electrodes and said counter electrode, said liquid crystal layer being made of a liquid crystal/resin composite consisting of a liquid crystal component and a resin component, wherein the refractive index of said liquid crystal component is equal to that of said resin component when liquid crystal molecules of said liquid crystal component are aligned in a direction; and
   a grating consisting essentially of protrusions having inclined surfaces and being applied to said first or second substrate, wherein the refractive index of said protrusions is equal to the refractive index of said liquid crystal layer when said liquid crystal molecules in said liquid crystal layer are aligned in a direction;
   wherein a maximum inclination angle of said inclined surfaces of said protrusions of said grating is 45° relative to said surface of said first or second substrate.

2. A liquid crystal panel comprising:
   a first transparent substrate including transparent pixel electrodes and switching elements for applying signals to said pixel electrodes, said transparent pixel electrodes and said switching elements being formed on a surface of the first substrate;
   a second substrate including a counter electrode which is made of a reflection film for reflecting incident light, said counter electrode being formed on a surface of said second substrate confronting said surface of said first substrate;
   a liquid crystal layer interposed between said pixel electrodes and said counter electrode, said liquid crystal layer being made of a liquid crystal/resin composite consisting of a liquid crystal component and a resin component, wherein the refractive index of said liquid crystal component is equal to that of said resin component when liquid crystal molecules of said liquid crystal component are aligned in a direction; and
   a grating consisting essentially of protrusions and being applied to said first or second substrate, wherein the refractive index of said protrusions is equal to the refractive index of said liquid crystal layer when said liquid crystal molecules in said liquid crystal layer are aligned in a direction;
   wherein the height of said protrusions is between 1 and 10 µm.

3. A liquid crystal panel comprising:
   a first transparent substrate including transparent pixel electrodes and switching elements for applying signals to said pixel electrodes, said transparent pixel electrodes and said switching elements being formed on a surface of the first substrate;
   a second substrate including a counter electrode which is made of a reflection film for reflecting incident light, said counter electrode being formed on a surface of said second substrate confronting said surface of said first substrate;
   a liquid crystal layer interposed between said pixel electrodes and said counter electrode, said liquid crystal layer being made of a liquid crystal/resin composite consisting of a liquid crystal component and a resin component, wherein the refractive index of said liquid crystal component is equal to that of said resin component when liquid crystal molecules of said liquid crystal component are aligned in a direction; and
   a grating consisting essentially of protrusions and being applied to said first or second substrate, wherein the refractive index of said protrusions is equal to the refractive index of said liquid crystal layer when said liquid crystal molecules in said liquid crystal layer are aligned in a direction;
   wherein the pitch of said protrusions is 15 µm or less.

4. A liquid crystal panel comprising:
   a first transparent substrate including transparent pixel electrodes and switching elements for applying signals to said pixel electrodes, said transparent pixel electrodes and said switching elements being formed on a surface of the first substrate;
   a second substrate including a counter electrode which is made of a reflection film for reflecting incident light, said counter electrode being formed on a surface of said second substrate confronting said surface of said first substrate;
   a liquid crystal layer interposed between said pixel electrodes and said counter electrode, said liquid crystal layer being made of a liquid crystal/resin composite consisting of a liquid crystal component and a resin component, wherein the refractive index of said liquid crystal component is equal to that of said resin component when liquid crystal molecules of said liquid crystal component are aligned in a direction; and
   a grating consisting essentially of protrusions and being applied to said first or second substrate, wherein the refractive index of said protrusions is equal to the refractive index of said liquid crystal layer when said liquid crystal molecules in said liquid crystal layer are aligned in a direction;
   wherein a ratio of the height of said protrusions to the pitch of said protrusions is a third or more.

5. A liquid crystal display comprising:
   a light source;
   a color separation system for separating said light generated by the light source into three optical paths respectively transmitting red, green and blue light;
   three liquid crystal panels each comprising (a) a first transparent substrate including transparent pixel electrodes and switching elements for applying signals to said pixel electrodes, said transparent pixel electrodes and said switching elements being formed on a surface of said first substrate, (b) a second substrate including a counter electrode and a reflection film for reflecting incident light, said counter electrode and said reflection film being formed on a surface of the second substrate confronting said surface of said first substrate, and (c) a liquid crystal layer interposed between said pixel electrodes and said counter electrode, said liquid crystal layer being made of a liquid crystal/resin composite consisting essentially of a liquid crystal component and a resin component, wherein the refractive index of said liquid crystal component is equal to that of said resin component when liquid crystal molecules of said liquid crystal component are aligned in a direction, and wherein said three liquid crystal panels are located respectively in said three optical paths; and a projection lens for projecting optical images modulated by said three liquid crystal panels;

wherein said color separation system comprises dichroic mirrors, and wherein said dichroic mirrors separate the incident color lights as well as synthesize modulated lights.

6. A liquid crystal display comprising:

a light source;

a color separation system for separating said light generated by the light source into three optical paths respectively transmitting red, green and blue light;

three liquid crystal panels each comprising (a) a first transparent substrate including transparent pixel electrodes and switching elements for applying signals to said pixel electrodes, said transparent pixel electrodes and said switching elements being formed on a surface of said first substrate, (b) a second substrate including a counter electrode formed on a surface of said second substrate confronting said surface of said first substrate, said counter electrode being made of a reflection film for reflecting incident light, (c) a liquid crystal layer interposed between said pixel electrodes and said counter electrode, said liquid crystal layer being made of a liquid crystal/resin composite consisting essentially of a liquid crystal component and a resin component, wherein the refractive index of said liquid crystal component is equal to that of said resin component when liquid crystal molecules of said liquid crystal component are aligned in a direction, and (d) a grating consisting essentially of protrusions applied to the first or second substrate, wherein the refractive index of said protrusions is equal to the refractive index of said liquid crystal layer when the liquid crystal molecules in said liquid crystal layer are aligned in a direction; and a projection lens for projecting optical images modulated by said three liquid crystal panels;

wherein said color separation system comprises dichroic mirrors and wherein said dichroic mirrors separate incident color lights as well as synthesize modulated lights.

7. A liquid crystal panel comprising:

a first transparent substrate including transparent pixel electrodes and switching elements for applying signals to said pixel electrodes, said transparent pixel electrodes and said switching elements being formed on a surface of the first substrate;

a second substrate having a smooth surface confronting said surface of said first substrate, said second substrate including a reflection electrode made of a metallic film formed on said smooth surface, said reflection electrode forming a common counter electrode opposing said pixel electrodes; and a liquid crystal layer interposed between the pixel electrodes and said reflection electrode, said liquid crystal layer being made of a liquid crystal/resin composite having a liquid crystal component and a resin component;

wherein the liquid crystal component comprises a nematic liquid crystal, wherein a normal refractive index $n_o$ of said nematic liquid crystal is between 1.45 and 1.55 and an extraordinary refractive index $n_e$ thereof is between 1.65 and 1.80, and wherein a refractive index $n_p$ of the resin component is substantially equal to an extraordinary refractive index $n_o$ of the nematic liquid crystal.

8. The liquid crystal panel according to claim 7, further comprising a third substrate having an uneven surface, said third substrate located on another surface of said first substrate opposite to said surface on which said pixel electrodes are formed such that said uneven surface faces away from said first substrate.

9. The liquid crystal panel according to claim 7, further comprising a film having an uneven surface, said film located on another surface of said first substrate opposite to said surface on which said pixel electrodes are formed.

10. The liquid crystal panel according to claim 7, further comprising an anti-reflection film formed on another surface of said first substrate opposite said surface on which said pixel electrodes are formed.

11. The liquid crystal panel according to claim 7, further comprising a heat radiation means coupled to said second substrate.

12. The liquid crystal panel according to claim 7, said resin component comprising an ultra-violet ray setting resin, wherein a ratio of said liquid crystal component in said liquid crystal/resin composite is between 50 and 90 wt % and a thickness of said liquid crystal layer is between 3 and 15 μm.

13. The liquid crystal panel according to claim 7, said pixel electrodes comprising a transparent dielectric thin film of optical thickness of about $\lambda/4$, and a transparent conductive thin film of optical thickness of about $\lambda/2$ applied to said transparent dielectric thin film, wherein $\lambda$ denotes a wavelength of incident light, said transparent dielectric thin film having an index of refraction between 1.5 and 1.8, said dielectric thin film being made of one of aluminum oxide ($Al_2O_3$), cerium fluoride ($CeF_3$), silicon monoxide (SiO), tungsten oxide ($WO_3$) and neodium fluoride ($NdF_3$).

14. The liquid crystal panel according to claim 13, further comprising a third substrate having an uneven surface, said third substrate located on another surface of said first substrate opposite to said surface on which said pixel electrodes are formed such that said uneven surface faces away from said first substrate.

15. The liquid crystal panel according to claim 13, further comprising a film having an uneven surface, said film located on another surface of said first substrate opposite to said surface on which said pixel electrodes are formed.

16. A liquid crystal panel comprising:

a first transparent substrate including transparent pixel electrodes and switching elements for applying signals to said pixel electrodes, said transparent pixel electrodes and said switching elements being formed on a surface of the first substrate;

a second substrate having a smooth surface confronting said surface of said first substrate and including a reflection electrode made of a metallic film formed on said smooth surface, said reflection electrode forming a common counter electrode opposing said pixel electrodes; and a liquid crystal layer interposed between said pixel electrodes and said reflection electrode, said liquid crystal layer being made of a liquid crystal/resin composite having a liquid crystal component and a resin component, said liquid crystal component comprising a nematic liquid crystal, said resin component comprising an ultra-violet ray setting resin, wherein a ratio of said liquid crystal component in said liquid crystal/resin composite is between 50 and 90 wt % and a thickness of said liquid crystal layer is between 3 and 15 µm;

wherein the liquid crystal component comprises a nematic liquid crystal, wherein a normal refractive index $n_o$ of said nematic liquid crystal is between 1.45 and 1.55 and an extraordinary refractive index $n_e$ thereof is between 1.65 and 1.80, and wherein a refractive index $n_p$ of the resin component is substantially equal to an extraordinary refractive index $n_o$ of the nematic liquid crystal.

17. The liquid crystal panel according to claim 16, further comprising a third substrate having an uneven surface, said third substrate located on another surface of said first substrate opposite to said surface on which said pixel electrodes are formed such that said uneven surface faces away from said first substrate.

18. The liquid crystal panel according to claim 16, further comprising a film having an uneven surface, said film located on another surface of said first substrate opposite to said surface on which said pixel electrodes are formed.

19. A liquid crystal panel comprising:

a first transparent substrate including transparent pixel electrodes and switching elements for applying signals to said pixel electrodes, said transparent pixel electrodes and said switching elements being formed on a surface of the first substrate;

a second substrate having a smooth surface confronting said surface of said first substrate, said second substrate including a reflection electrode made of a metallic film formed on said smooth surface, said reflection electrode forming a common counter electrode opposing said pixel electrodes; and a liquid crystal layer interposed between the pixel electrodes and said reflection counter electrode, said liquid crystal layer being made of a liquid crystal/resin composite having a liquid crystal component and a resin component; and a grating consisting essentially of protrusions having inclined surfaces and applied to the first or second substrate on a surface thereof facing said liquid crystal layer, wherein a refractive index of the protrusions is equal to the refractive index of the liquid crystal layer when liquid crystal molecules in the liquid crystal layer are aligned in a direction.

20. The liquid crystal panel according to claim 19, said liquid crystal component comprising a nematic liquid crystal, said resin component comprising an ultra-violet ray setting resin, wherein a ratio of said liquid crystal component in said liquid crystal/resin composite is between 50 and 90 wt %, wherein a normal refractive index $n_o$ of said nematic liquid crystal is between 1.45 and 1.55 and an extraordinary refractive index $n_e$ thereof is between 1.65 and 1.80, and wherein a refractive index $n_p$ of the resin component is substantially equal to an extraordinary refractive index $n_e$ of the nematic liquid crystal.

21. The liquid crystal panel according to claim 19, wherein a maximum inclination angle of said inclined surfaces of said protrusions of said grating is 45° from said surface of said first or second substrate.

22. The liquid crystal panel according to claim 19, wherein the height of said protrusions is between 1 and 10 µm.

23. The liquid crystal panel according to claim 19, wherein the pitch of said protrusions is 15 µm or less.

24. The liquid crystal panel according to claim 19, wherein a ratio of the height of said protrusions to the pitch of said protrusions is a third or more.

25. The liquid crystal panel according to claim 19, wherein a refractive index of said grating is substantially equal to a normal index of refraction $n_o$ of said liquid crystal component while the refractive index $n_p$ of the resin component is substantially equal to an extraordinary index of refraction $n_e$ of said liquid crystal component.

26. The liquid crystal panel according to claim 25, said liquid crystal component comprising a nematic liquid crystal, said resin component comprising an ultra-violet ray setting resin, wherein a ratio of said liquid crystal component in said liquid crystal/resin composite is between 50 and 90 wt %, wherein a normal refractive index $n_o$ of said nematic liquid crystal is between 1.45 and 1.55 and an extraordinary refractive index $n_e$ thereof is between 1.65 and 1.80, and wherein a refractive index $n_p$ of the resin component is substantially equal to an extraordinary refractive index $n_e$ of the nematic liquid crystal.

27. The liquid crystal panel according to claim 25, wherein a maximum inclination angle of said inclined surfaces of said protrusions of said grating is 45° from said surface of said first or second substrate.

28. The liquid crystal panel according to claim 25, wherein the height of said protrusions is between 1 and 10 µm.

29. The liquid crystal panel according to claim 25, wherein the pitch of said protrusions is 15 µm or less.

30. The liquid crystal panel according to claim 25, wherein a ratio of the height of said protrusions to the pitch of said protrusions is a third or more.

31. A liquid crystal panel comprising:

a first transparent substrate including transparent pixel electrodes and switching elements for applying signals to said pixel electrodes, said transparent pixel electrodes and said switching elements being formed on a surface of the first substrate, said pixel electrodes comprising a transparent dielectric thin film of optical thickness of about λ/4, and a transparent conductive thin film of optical thickness of about λ/2 applied to said transparent dielectric thin film, wherein λ denotes a wavelength of incident light, said transparent dielectric thin film having an index of refraction between 1.5 and 1.8, said dielectric thin film being made of one of aluminum oxide ($Al_2O_3$), cerium fluoride ($CeF_3$), silicon monoxide (SiO), tungsten oxide ($WO_3$) and neodium fluoride ($NdF_3$);

a second substrate including a counter electrode which is made of a reflection film for reflecting incident light, said counter electrode being formed on a smooth surface of said second substrate and forming a common electrode opposing said pixel electrodes and reflecting light which transmits through said pixel electrodes;

a liquid crystal layer interposed between said pixel electrodes and said counter electrode, said liquid crystal layer being made of a liquid crystal/resin composite consisting essentially of a liquid crystal component and a resin component, wherein the refractive index of said liquid crystal component is equal to that of said resin component when liquid crystal molecules of said liquid crystal component are aligned in a direction; and a grating consisting essentially of protrusions and applied to the first or second substrate, wherein the refractive index of the protrusions is equal to the refractive index of the liquid crystal layer when the liquid crystal molecules in said liquid crystal layer are aligned in a direction, wherein the refractive index of said grating is substantially equal to a normal index of refraction $n_o$ and to an extraordinary index of refractive $n_e$ of the resin component of the liquid crystal layer.

32. The liquid crystal panel according to claim 31, said liquid crystal component comprising a nematic liquid crystal, said resin component comprising an ultra-violet ray setting resin, wherein a ratio of said liquid crystal component in said liquid crystal/resin composite is between 50 and 90 wt %, wherein a normal refractive index $n_o$ of said nematic liquid crystal is between 1.45 and 1.55 and an extraordinary refractive index $n_e$ thereof is between 1.65 and 1.80, and wherein a normal refractive index $n_p$ of the resin component is substantially equal to an extraordinary refractive index $n_e$ of the nematic liquid crystal.

33. A liquid crystal display comprising:

a liquid crystal panel comprising (a) a first transparent substrate including transparent pixel electrodes and switching elements for applying signals to said pixel electrodes, said transparent pixel electrodes and said switching elements being formed on a surface of the first substrate, (b) a second substrate having a smooth surface, said second substrate including a reflection electrode made of metallic film formed on said smooth surface, said reflection electrode forming a common electrode opposing said pixel electrodes, and (c) a liquid crystal layer interposed between the pixel electrodes and the reflection electrode, said liquid crystal layer being made of a liquid crystal/resin composite having a liquid crystal component and a resin component;

a light source;

a first optical element for guiding the light generated by the light source to said liquid crystal panel; and a second optical element for projecting light modulated by said liquid crystal panel;

wherein the liquid crystal component comprises a nematic liquid crystal, the resin component comprises an ultra-violet ray setting resin, a ratio of the liquid crystal component in said liquid crystal/resin composite is between 50 and 90 wt %, a normal refractive index $n_o$ of the nematic liquid crystal is between 1.45 and 1.55, an extraordinary refractive index $n_e$ thereof is between 1.65 and 1.80, and a refractive index $n_p$ of the polymer component is substantially equal to an extraordinary refractive index $n_o$ of the nematic liquid crystal.

34. The liquid crystal panel according to claim 33, further comprising a third substrate having an uneven surface, said third substrate located on another surface of said first substrate opposite to said surface on which said pixel electrodes are formed such that said uneven surface faces away from said first substrate.

35. The liquid crystal panel according to claim 33, further comprising a film having an uneven surface, said film located on another surface of said first substrate opposite to said surface on which said pixel electrodes are formed.

36. The liquid crystal panel according to claim 33, further comprising a heat radiation means coupled to said second substrate.

37. The liquid crystal panel according to claim 36, wherein said heat radiation means comprises a heat radiation plate.

38. The liquid crystal display according to claim 33, wherein said light source comprises a metal halide lamp or a xenon lamp, an arc length of said metal halide lamp or said xenon lamp being substantially 5 mm or less.

39. A liquid crystal display comprising:

a liquid crystal panel comprising (a) a first transparent substrate including transparent pixel electrodes and switching elements for applying signals to said pixel electrodes, said transparent pixel electrodes and said switching elements being formed on a surface of the first substrate, (b) a second substrate having a smooth surface, said second substrate including a reflection electrode made of metallic film formed on said smooth surface, said reflection electrode forming a common electrode opposing said pixel electrode, and (c) a liquid crystal layer interposed between the pixel electrodes and the reflection electrode, said liquid crystal layer being made of a liquid crystal/resin composite; and (d) a grating consisting essentially of protrusions and applied to the first or second substrate on a surface thereof facing said liquid crystal layer, wherein the refractive index of said protrusions is equal to the refractive index of said liquid crystal layer when liquid crystal molecules in said liquid crystal layer are aligned in a direction;

a light source;

a first optical element for guiding light generated by said light source to said liquid crystal panel; and a second optical element for projecting the light modulated by said liquid crystal panel.

40. The liquid crystal panel according to claim 39, further comprising a third substrate having an uneven surface, said third substrate located on another surface of said first substrate opposite to said surface on which said pixel electrodes are formed such that said uneven surface faces away from said first substrate.

41. The liquid crystal panel according to claim 39, further comprising a film having an uneven surface, said film located on another surface of said first substrate opposite to said surface on which said pixel electrodes are formed.

42. The liquid crystal panel according to claim 39, said liquid crystal component comprising a nematic liquid crystal, said resin component comprising an ultra-violet ray setting resin, wherein a ratio of said liquid crystal component in said liquid crystal/resin composite is between 50 and 90 wt %, wherein a normal refractive index $n_o$ of said nematic liquid crystal component is between 1.45 and 1.55 and an extraordinary refractive index $n_e$ thereof is between 1.65 and 1.80, and wherein a refractive index $n_p$ of the resin component is substantially equal to an extraordinary refractive index $n_e$ of the inclined nematic liquid crystal.

43. The liquid crystal display according to claim 39, wherein said light source comprises a metal halide lamp or a xenon lamp, an arc length of said metal halide lamp or said xenon lamp being substantially 5 mm or less.

44. The liquid crystal panel according to claim 39, wherein said pixel electrodes comprises a transparent dielectric thin film of optical thickness of about $\lambda/4$, and a transparent conductive thin film of optical thickness of about $\lambda/2$ applied to said transparent dielectric thin film, wherein $\lambda$ denotes a wavelength of incident light, which transparent dielectric thin film having an index of refraction between 1.5 and 1.8, which dielectric thin film being made of one of aluminum oxide ($Al_2O_3$), cerium fluoride ($CeF_3$), silicon monoxide (SiO), tungsten oxide ($WO_3$) and neodium fluoride ($NdF_3$), and wherein said liquid crystal component comprises a nematic liquid crystal, said resin component comprising an ultra-violet ray setting resin, wherein a ratio of said liquid crystal component in said liquid crystal/resin composite is between 50 and 90 wt % and a thickness of said liquid crystal layer is between 3 and 15 μm.

45. The liquid crystal panel according to claim 39, further comprising a heat radiation means coupled to said second substrate.

46. The liquid crystal panel according to claim 45, wherein said heat radiation means comprises a heat radiation plate.

47. A liquid crystal display comprising:

a light source;

a color separation system for separating light generated by said light source into three optical paths respectively transmitting red, green and blue light;

three liquid crystal panels each comprising (a) a first transparent substrate including transparent pixel electrodes and switching elements for applying signals to said pixel electrodes, said transparent pixel electrodes and said switching elements being formed on a surface of said first substrate, (b) a second substrate including a reflection electrode made of a metallic film formed on the smooth surface of said second substrate, said reflection electrode forming a common counter electrode opposing said pixel electrodes, and (c) a liquid crystal layer interposed between the pixel electrodes and said reflection electrode, said liquid crystal layer being made of a liquid crystal/resin composite;

a projection means for projecting optical images modulated by said three liquid crystal panels;

wherein said color separation system comprises dichroic mirrors, and wherein said dichroic mirrors separate incident color light as well as synthesize modulated lights.

48. The liquid crystal display according to claim 47, wherein said pixel electrodes include a transparent dielectric thin film having an index of refraction between 1.5 and 1.8, said dielectric thin film being made of one of aluminum oxide ($Al_2O_3$), cerium fluoride ($CeF_3$), silicon monoxide (SiO), tungsten oxide ($WO_3$) and neodium fluoride ($NdF_3$).

* * * * *

UNITED STATES PATENT AND TRADEMARK OFFICE
CERTIFICATE OF CORRECTION

PATENT NO. : 5,477,351

DATED : December 19, 1995

INVENTOR(S) : Hiroshi TAKAHARA et al.

It is certified that error appears in the above-indentified patent and that said Letters Patent is hereby corrected as shown below:

Column 9, line 23, change "$(n_o=n_e)/2$" to --$(n_o+n_e)/2$--.

Column 18, line 8, delete "an extraordi-";
    line 9, delete "nary" and insert in its place --the normal--.

Column 19, line 13, delete "an extraordi-";
    line 14, delete "nary" and insert in its place --the normal--;
    line 58, delete "an extraordinary" and insert in its place --the normal--;
    line 59, change "$n_e$" to --$n_o$--.

Column 20, line 10, delete "an extraordinary" and insert in its place --the normal--;
    line 11, change "$n_e$" to --$n_o$--;
    line 21, delete "an extraordinary" and insert in its place --the normal--;
    line 22, change "$n_e$" to --$n_o$--.

UNITED STATES PATENT AND TRADEMARK OFFICE
CERTIFICATE OF CORRECTION

PATENT NO. : 5,477,351
DATED : December 19, 1995
INVENTOR(S) : Hiroshi TAKAHARA et al.

It is certified that error appears in the above-indentified patent and that said Letters Patent is hereby corrected as shown below:

Column 21, line 46, delete "polymer" and insert in its place --resin--.

line 47, delete "an extraordinary" and insert in its place --the normal--.

Column 22, line 47, delete "an extraordinary" and insert in its place --the normal--;

line 48, change "$n_e$" to --$n_o$--

Signed and Sealed this

Sixth Day of May, 1997

Attest:

BRUCE LEHMAN

*Attesting Officer*     Commissioner of Patents and Trademarks